(12) United States Patent
Diana et al.

(10) Patent No.: US 11,754,255 B2
(45) Date of Patent: Sep. 12, 2023

(54) CURVED LIGHT-GUIDE OPTICS FOR LED STREET LIGHTING

(71) Applicant: Lumileds LLC, San Jose, CA (US)

(72) Inventors: Frederic Stephane Diana, Santa Clara, CA (US); Mehdi Aas, Eindhoven (NL); Charles André Schrama, San Jose, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 17/121,482

(22) Filed: Dec. 14, 2020

(65) Prior Publication Data

US 2021/0190293 A1 Jun. 24, 2021

Related U.S. Application Data

(60) Provisional application No. 62/951,714, filed on Dec. 20, 2019.

(51) Int. Cl.
*F21V 5/04* (2006.01)
*F21S 8/08* (2006.01)
*F21Y 115/10* (2016.01)

(52) U.S. Cl.
CPC ............. *F21V 5/045* (2013.01); *F21S 8/086* (2013.01); *F21V 2200/20* (2015.01); *F21Y 2115/10* (2016.08)

(58) Field of Classification Search
CPC ..... F21S 8/032; G02B 6/0045; G02B 6/0001; F21V 5/045
See application file for complete search history.

(56) References Cited

U.S. PATENT DOCUMENTS

| | | | |
|---|---|---|---|
| 10,317,613 B1* | 6/2019 | Sorensen | F21V 3/0625 |
| 2017/0242182 A1* | 8/2017 | Diana | G02B 6/0055 |
| 2018/0039108 A1* | 2/2018 | Shim | H01L 27/153 |
| 2018/0113244 A1* | 4/2018 | Vasylyev | G02B 6/002 |
| 2019/0003684 A1* | 1/2019 | Hukkanen | F21V 5/08 |
| 2019/0353328 A1* | 11/2019 | Pickard | G02B 6/003 |
| 2020/0374995 A1* | 11/2020 | Bretschneider | H05B 47/11 |
| 2021/0332968 A1* | 10/2021 | Cerv | B29C 48/22 |

* cited by examiner

*Primary Examiner* — Christopher E Dunay
(74) *Attorney, Agent, or Firm* — Schwegman, Lundberg & Woessner, P.A.

(57) ABSTRACT

A luminaire can include a curved light guide plate including a first receiving surface, an emitting surface, a major surface opposing the emitting surface, second and third receiving surfaces, the first receiving surface extending in a first dimension between the major surface and the emitting surface and extending in a second dimension between the second and third receiving surfaces, the first receiving surface, emitting surface, and major surface including a positive, non-zero radius of curvature (R) and the second and third receiving surfaces generally planar, and a plurality of LEDs positioned to emit light into one or more of the first receiving surface, second receiving surface, third receiving surface, or a fourth receiving surface, the fourth receiving surface opposing the first receiving surface.

20 Claims, 23 Drawing Sheets

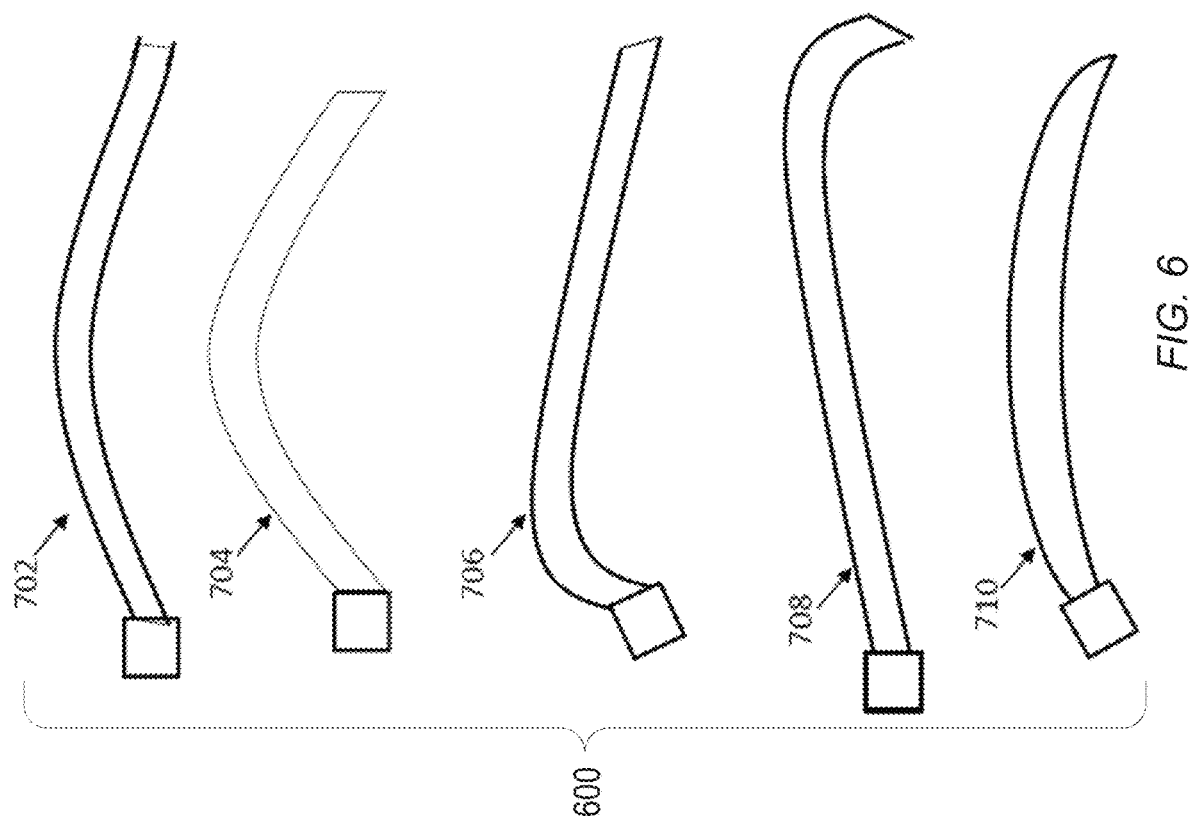

CURVED LIGHT-GUIDE OPTICS FOR LED STREET LIGHTING

CLAIM OF PRIORITY

This application claims the benefit of priority under 35 U.S.C. § 119(e) of U.S. Provisional Patent Application Ser. No. 62/951,714, filed on Dec. 20, 2019, which is herein incorporated by reference in its entirety.

TECHNICAL FIELD

The present disclosure relates generally to edge-lit light emitting diode (LED) light guide plates (LGPs) used for streetlamp or other area lighting. Plates with a single, constant radius of curvature (R) or LGPs with more complex curves can be used.

BACKGROUND

Conventional streetlights are being replaced by more efficient and more reliable LED luminaires. A desired light intensity distribution provides the highest peak light intensity along a street with very little light intensity in a direction opposite to the street. The side of the luminaire facing away from the street is referred to herein as the "house side," and the side of the luminaire facing the street is referred to herein as the "street side." The light intensity in the house side direction can be just sufficient to illuminate a sidewalk or curb along the street.

Modem streetlights using LEDs control the light intensity distribution using asymmetrical lenses over high power LEDs. Alternatively, conventional secondary optics are used to direct the light downward and sideways while blocking the light from being emitted in the house side direction. Such streetlights have high glare when an observer looks directly at the luminaire. For example, one type of streetlight uses two parallel columns of eight high power white light LEDs with a separate lens over each LED. When viewed directly, sixteen very bright point sources are seen. This is referred to as pixelated lighting and is aesthetically undesirable.

What is needed is an efficient luminaire using LEDs that has a controllable light intensity distribution, and can be optimized for overhead street lighting, where the luminaire has a non-pixelated pattern when viewed directly.

SUMMARY

A luminaire can include a curved light guide plate including a first receiving surface. The luminaire can include an emitting surface. The luminaire can include a major surface opposing the emitting surface. The luminaire can include second and third receiving surfaces, the first receiving surface extending in a first dimension between the major surface and the emitting surface and extending in a second dimension between the second and third receiving surfaces, the first receiving surface, emitting surface, and major surface including a positive, non-zero radius of curvature (R) and the second and third receiving surfaces generally planar. The luminaire can include a plurality of LEDs positioned to emit light into one or more of the first receiving surface, second receiving surface, third receiving surface, or a fourth receiving surface, the fourth receiving surface opposing the first receiving surface.

The luminaire can further include, wherein the first receiving surface, fourth receiving surface, emitting surface, and major surface are symmetric about a first axis longitudinally bisecting the emitting surface. The luminaire can further include, wherein the first receiving surface, fourth receiving surface, emitting surface, and major surface include two portions with different radius of curvatures. The luminaire can further include, wherein light emitted out the emitting surface provides a generally rectangular light distribution.

The luminaire can further include light diffusing features on the major surface. The luminaire can further include, wherein the diffusing features include Gaussian dots distributed on the major surface. The luminaire can further include, wherein the light diffusing features are epoxy dots distributed on the major surface. The luminaire can further include, wherein the light diffusing features diffuse an incident light ray along a direction of the incident light ray and provide a light spread of between about 6 and 18 degrees (HWHM).

The luminaire can further include, wherein the light diffusing features are randomly distributed on the major surface. The luminaire can further include, wherein a light emission from the emitting surface provides a distribution peak angle that is variable relative to a horizontal angle.

A lighting system can include a curved light guide plate (LGP) including a first receiving surface. The LGP can further include an emitting surface. The LGP can further include a major surface opposing the emitting surface. The LGP can further include second and third receiving surfaces, the first receiving surface extending in a first dimension between the major surface and the emitting surface and extending in a second dimension between the second and third receiving surfaces, the first receiving surface, emitting surface, and major surface including a positive, non-zero radius of curvature (R) and the second and third receiving surfaces generally planar. The lighting system can further include a plurality of LEDs positioned to emit light into one or more of the first receiving surface, second receiving surface, third receiving surface, or a fourth receiving surface, the fourth receiving surface opposing the first receiving surface. The LGP can further include a reflective surface positioned at least partially under the curved light guide plate. The lighting system can further include a light emitting diode (LED) controller electrically coupled to the plurality of LEDs.

The lighting system can further include, wherein the first receiving surface, fourth receiving surface, emitting surface, and major surface are symmetric about a first axis longitudinally bisecting the emitting surface. The lighting system can further include, wherein the first receiving surface, fourth receiving surface, emitting surface, and major surface include two portions with different radius of curvatures. The lighting system can further include, wherein light emitted out the emitting surface provides a generally rectangular light distribution.

The lighting system can further include light diffusing features on the major surface. The lighting system can further include, wherein the diffusing features include Gaussian dots distributed on the major surface. The lighting system can further include, wherein the light diffusing features are epoxy dots distributed on the major surface.

The lighting system can further include, wherein the light diffusing features diffuse an incident light ray along a direction of the incident light ray and provide a light spread of between about 6 and 18 degrees (HWHM). The lighting system can further include, wherein the light diffusing features are randomly distributed on the major surface. The lighting system can further include, wherein a light emission from the emitting surface provides a distribution peak angle that is variable relative to a horizontal angle.

BRIEF DESCRIPTION OF THE DRAWINGS

FIG. 6 illustrates, by way of example, a perspective view diagram of various shapes possible for a suitable edge lit curved LOP.

DETAILED DESCRIPTION

Figure 1:
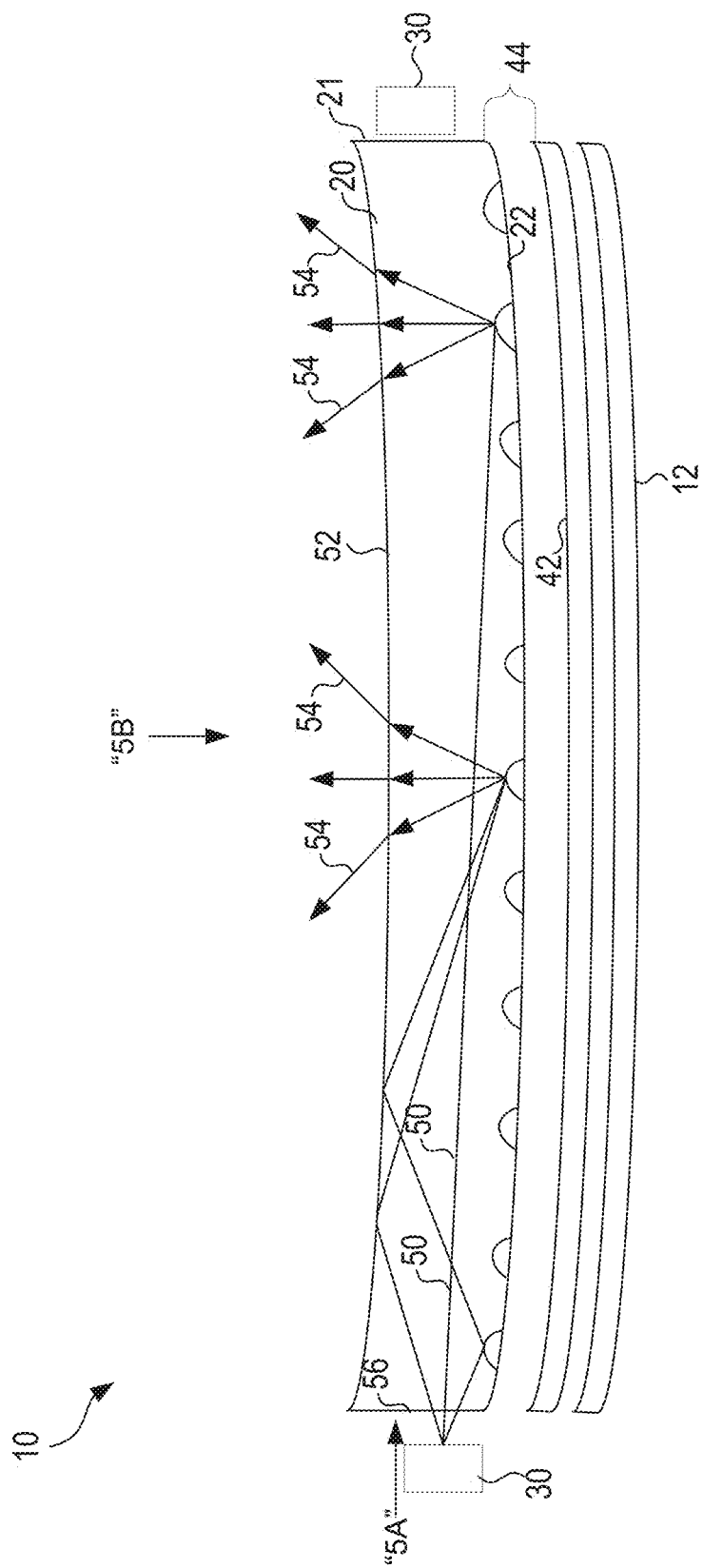
FIG. 1 illustrates, by way of example, a cross-section diagram of an embodiment of an LOP with light emitting elements disposed on respective sides of the LOP.

FIG. 1 illustrates, by way of example, a diagram of an embodiment of a lighting unit 10 comprising a light guide 20 disposed over a protection plate 12, and a light emitting element 30 disposed on a side of the light guide 20. Some light 50 entering the light guide 20 from the light emitting element 30 is reflected towards an emitting surface 52 of the light guide 20 by a patterned opposing surface 22. An optional reflection sheet 42 can be positioned between the light guide 20 and backplate 12. Light can exit from the light guide 20 at the emitting surface 52. The reflection sheet 42 is separated from the bottom surface 22 by a an air gap 44. The reflection sheet 42 can include a polarization maintaining surface, such as a mirror. The reflection sheet 42 can include a scattering surface (e.g., a white painted surface). Light diffusing features 53 can be printed or molded on the surface 22, for example.

Figure 2:
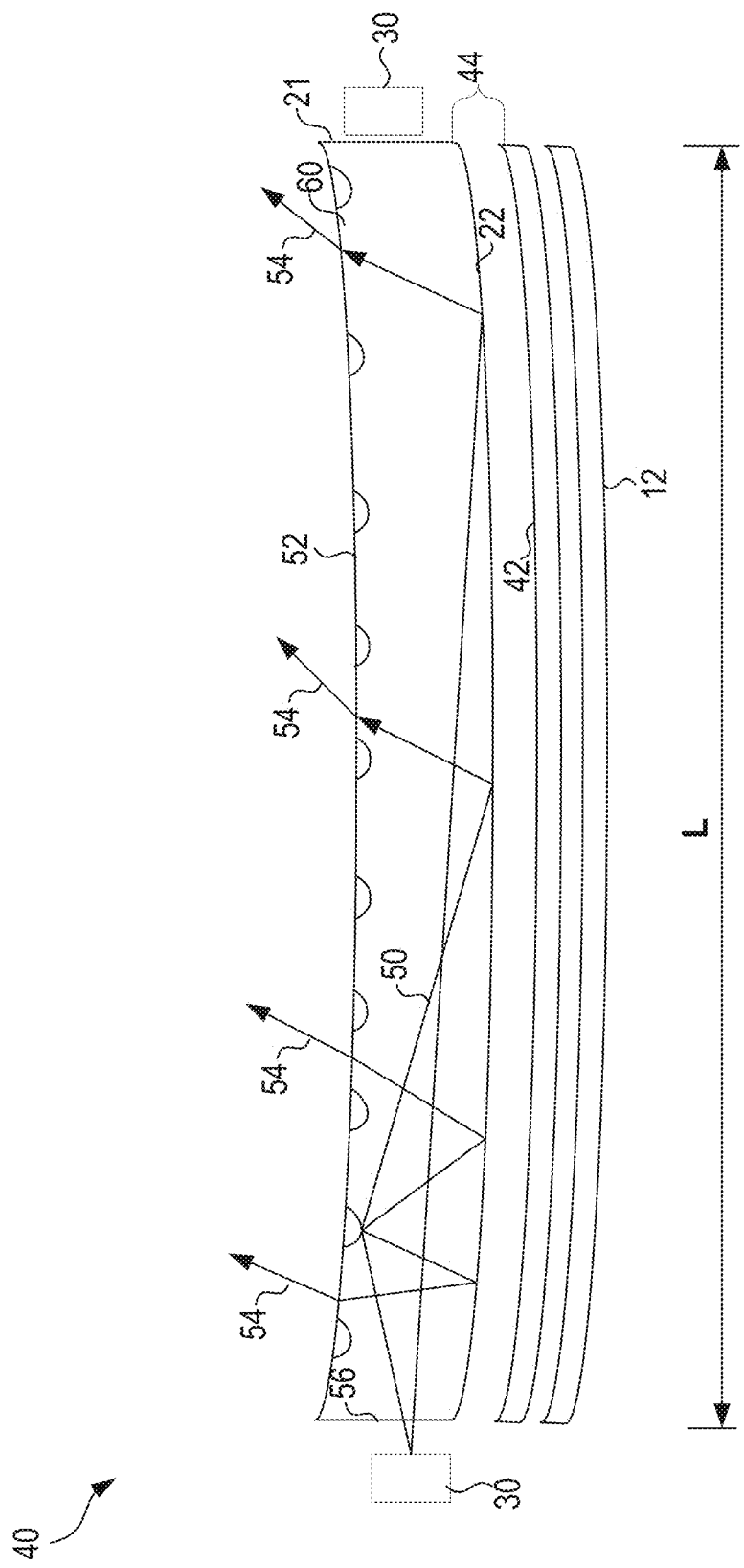
FIG. 2 illustrates, by way of example, a cross-section diagram of another embodiment of an LOP with light emitting elements disposed on respective sides of the LOP.

FIG. 2 illustrates, by way of example, a diagram of an embodiment of a lighting unit 40 comprising a light guide 60 disposed over a protection plate 12. The light guide 60 is similar to the light guide 20 of FIG. 1 with light diffusing features on a patterned emitting surface 52 instead of a patterned bottom surface 22.

In some embodiments, the light emitting element 30 can be a rectangular single line array or multiple line array. In other embodiments, the light emitting element 30 can be formed or otherwise fabricated in a shape approximating a nonrectangular (e.g., circular or oval) shape. Light emitting elements, such as light emitting diodes (LEDs) can be of a single or multiple colors, or in some embodiments red, green, blue (RGB) arrays. Different color pixels can be interleaved, or in other embodiments, the different color pixels can have other groupings in which groups of one color are disposed together in one or both orthogonal directions. In other embodiments at least some of the sets of light emitting elements can provide different wavelengths of light for color tuning. For example, one set of light emitting elements can provide white light while the other set of light emitting elements may provide red light. The light emitting elements can be formed from a II-VI, III-V, or other compound semiconductor that may be a binary, ternary, quaternary, or other compound. For example, gallium nitride (GaN) is used for blue LEDs, gallium arsenide (GaAs) for infrared (IR) LEDs, and indium gallium phosphide (InGaP), indium gallium aluminum phosphide (InGaAlP), or indium gallium arsenic phosphide (InGaAsP) for visible LEDs, among others. Alternatively, a wavelength converting structure may be disposed in the path of light extracted from the LED, The wavelength converting structure includes one or more wavelength converting materials which may be, for example, conventional phosphors, organic phosphors, quantum dots, organic semiconductors. II-VI or III-V semiconductors, II-VI or III-V semiconductor quantum dots or nanocrystals, dyes, polymers, or other materials that luminesce. The wavelength converting material includes light scattering or light diffusing elements, such as titanium dioxide (TiO2), absorbs light emitted by the LED, and emits light of one or more different wavelengths. The light provided by the light source may be white, polychromatic, or monochromatic.

Light diffusing features 53 in the form of a printed pattern can include Gaussian pattern dot placement. The LGP 20, 60 can include a transparent polymer, such as polymethyl methyl acrylate (PMMA). The LGP 20, 60 can be about 4-5 mm thick (in a dimension generally perpendicular to L and W. The reflector sheet 42 can be positioned over the LGP 20, 60 and LEDs 30 to reflect light away from the backplate 12. The LEDs 30 have a generally Lambertian emission. In one embodiment, the reflector sheet 42 is specular, or a slightly diffusing mirror sheet, to substantially retain the directionality of the light rays to obtain better control over the asymmetry of the light intensity distribution. In another embodiment, the reflector sheet 42 may have a white surface to greatly increase the diffusion of light. The reflector sheet 42 may be spaced from the light guide or directly placed on the light guide surface.

In some embodiments, to provide more control over the asymmetry of the light intensity distribution, the LEDs 30 can be configured to emit different amounts of light. LEDs in other locations around the light guide 20, 60 may be designed to have different light outputs to further customize the light intensity distribution. Alternatively, different currents may be applied to identical LEDs to customize the light output from the segments. LEDs 30 can be designed to emit a high brightness for being located along the rear portion (house side) of the luminaire, so that the high brightness is directed along the street and away from the house side. In one embodiment, each LED around the light guide is identical and receives the same current, and the light intensity distribution of the lamp is customized using other techniques discussed herein.

The diffusing features 53 can include Gaussian printed dots. LEDs 130 can emit white light into the light guide 20, 60. The light guide 20, 60 seats in a frame with the features 53 on the surface 22 away from the street 314. The light can reflect off a first smooth inner surface of the light guide 20, 60 by total internal reflection (TIR) until the light is reflected downward. Alternatively, or in addition, light can impinge on a features 53 coated or printed on the surface 22 of the light guide 60, 20, The features 53 may be epoxy-based and contain diffusing particles (e.g., titanium oxide (TiO2), high index micro-beads, etc.) that only slightly diffuse the light, such as by spreading the light a half width, half maximum spread (HWHM) of about 12 degrees, centered around the direction of the impinging light ray. This retains some directionality of the impinging light but sufficiently diffuses the light so that the luminaire appears uniformly white to an observer. Some of the diffused light from the feature 53 is also reflected back into the light guide 60, 20 to eventually escape through a light emitting surface 52 surface of the light guide 60, 20. Light that escapes from the surface 22 of the light guide 60, 20 can be reflected back into the light guide 20, 60 by the reflector sheet 42, As previously mentioned, the reflector sheet 42 can be specular (for the most directionality), diffuse specular, or white (for the least directionality). In one embodiment, about 50 percent of the light entering the light guide 60, 20 exits without being diffused by a feature 53, and the remaining 50 percent is diffused by the feature 53, since the features 53 cover about half of the top surface 22 of the light guide 60, 20. The features 53 can be other than hemispherical, such as rounded rectangular, rounded triangular, flat top circles, flat sided prisms, or other suitable shapes that create a diffused Gaussian emission.

Advantageously, use of light-extracting texture or ink layer at the top inner second surface 17 (the one facing the backside reflector 42 typically), combined with the use of randomized ink layer dots or layer will prevent Moire-related effects (unwanted modulations of the light intensity) in near-field and far-field. In turn, this produces an improved outcome of higher peak angle, and increases the fraction of light above peak angle to increase the vertical illuminance in applications such as parking. In certain embodiments, the light guide 20, 60 can be printed with translucent dots to increase light extraction efficiency and broaden the street side beam. The features 53 may be about 1 mm in diameter and have a Gaussian light emission (as opposed to Lambertian). The features 53 diffuse the incident light ray somewhat along the direction of the incident light ray and can provide a light spread of between 6 and 18 degrees (measured as HWHM), with 12 being typical. The features 53 may be uniformly arrayed on the top surface 22 of the light guide and take up about half the area of the light emitting surface. Alternatively, the features 53 can have a variable size distribution or variable density distribution to improve the luminance uniformity over the entire emitting surface 52. A Gaussian, continuous diffusive layer or surface texture (such as a more or less "frosted glass" finish) could also be used instead of features 53.

Figure 3:
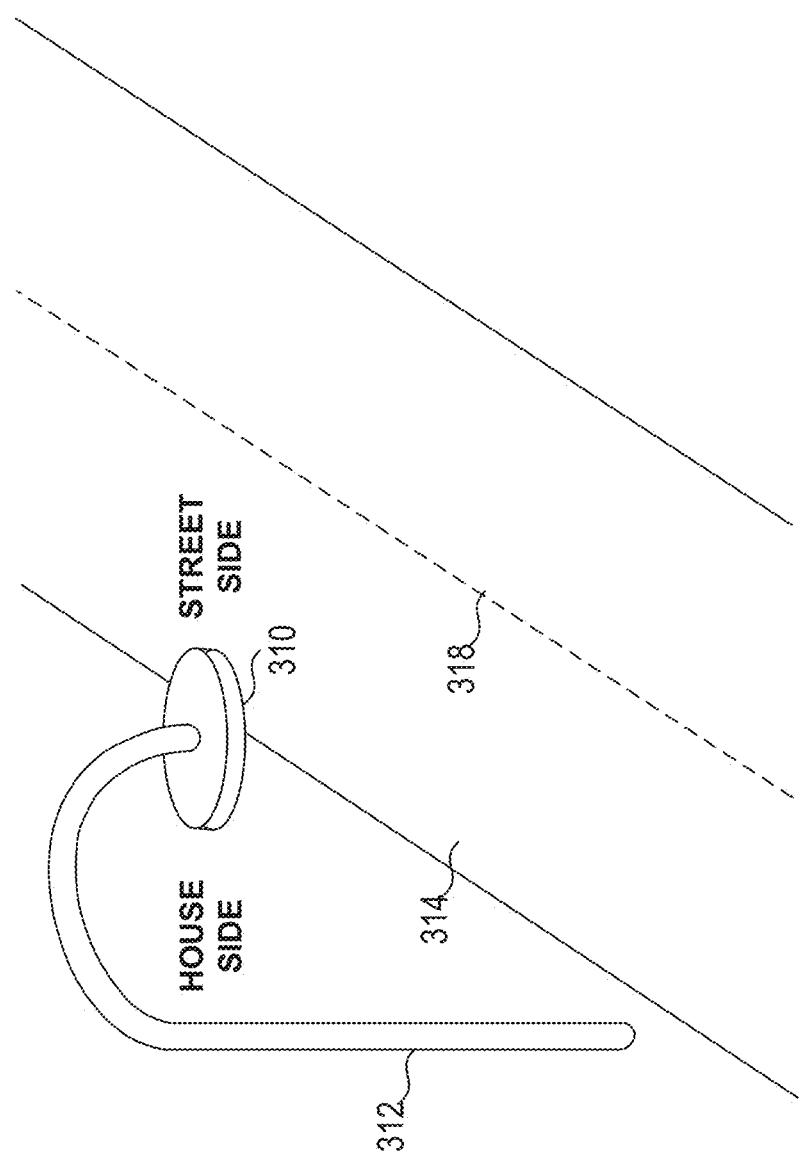
FIG. 3 illustrates, by way of example, a perspective view diagram of an embodiment of a luminaire used as an overhead streetlamp.

FIG. 3 illustrates a luminaire 310 supported by a support structure 312 over a street 314. The luminaire 310 can include the lighting unit 10, 40 of FIGS. 1 and 2, for example. An asymmetrical light intensity distribution of the luminaire 310 is described with respect to the street side and the house side. The desired light intensity distribution is a high light intensity along a certain length of the street, a lower light intensity that extends across the street, and a much lower light intensity that is emitted in the opposite direction toward the house side. The light along the length of the street 314 can blend with light from an adjacent streetlight to provide a fairly uniform illumination of the entire street. Light can spread over the entire bottom surface of the light-emitting portion of the luminaire 310, such as to create a substantially uniform diffused light that is much more pleasant than a pixelated light pattern provided by direct lit LED luminaire systems. Direct meaning that the light is pointed at the street and in contrast to indirect lighting that is provided using an LGP discussed herein. The indirect lighting can be from an LED 30 emitting light generally parallel to the street 314 and getting redirected (by internal reflection within the LGP) before exiting the LGP to the street 314.

Figure 4:
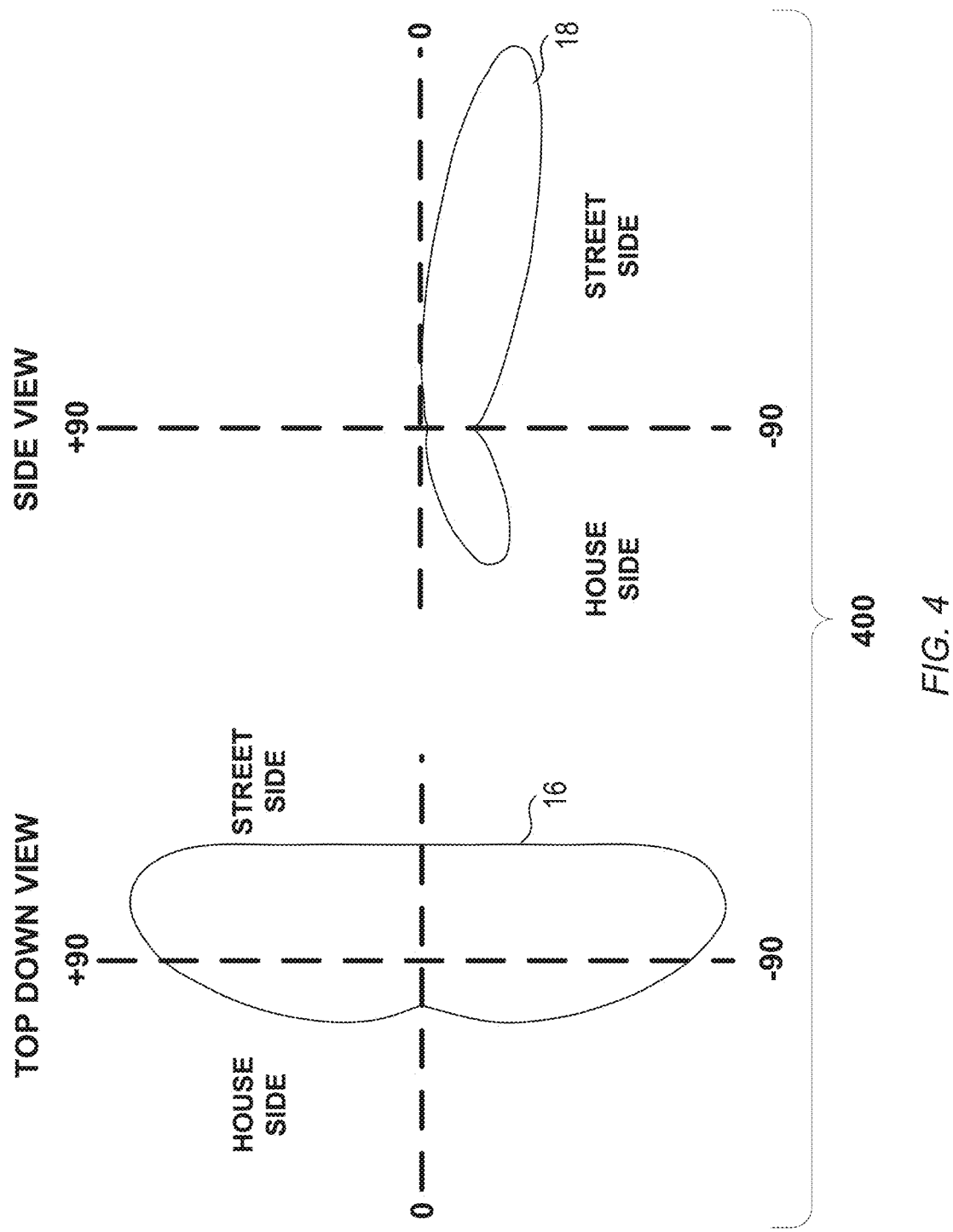
FIG. 4 illustrates in respective top and side views light intensity distribution, from a test of the overhead streetlamp of FIG. 3, in a horizontal cone intersecting the vertical angle for which the emitted luminous intensity (candela) is maximum, and with the vertical plane intersecting the horizontal angle for which the emitted luminous intensity (candela) is maximum, showing the highest light intensity being directed along the street at a slightly downward angle and a much lower light intensity directed toward the house side.

FIG. 4 illustrates, by way of example desirable light intensity distributions 400 (measured in candelas), obtained from a streetlight including the LGP of FIG. 1 or 2. The top down view intensity distribution 16 can be in a horizontal cone intersecting a vertical angle for which an emitted luminous intensity (candela) is a maximum, and where the luminaire is at the intersection of axes. The side view intensity distribution can be in a vertical plane intersecting a horizontal angle for which the emitted luminous intensity (candela) is maximum. Also shown in the side view is an example of a desirable light intensity distribution 18, In the example shown, the highest peak light intensity is directed along the street at a slightly downward angle and a much lower peak light intensity is directed toward the house side. The street side peak light intensity is well over three times the peak intensity directed toward the house side, and in this embodiment the light intensities are substantially mirror images relative to a center line perpendicular to the street.

Many other similar distributions are achievable and the optimal distribution may depend on the particular characteristics of the street to be illuminated. For example, for narrower streets, the street-side intensity distribution directed perpendicular to a longitudinal axis of the street can be concave relative to a person standing under the streetlamp 310 and facing the street 314. In the example shown, the peak light intensity directed along (generally parallel to the longitudinal axis 318) the street 314 is about 2-3 times higher than the peak light intensity directed directly perpendicular to the longitudinal axis 318. The peak light intensity directed toward the house side is less than one-third of the light intensity directed in the street 314 and generally perpendicular to the longitudinal axis 318. Such house side light may be used for illuminating pathways along the street or for the curb area, such as if the LGP 10, 40 is suspended into the street 314.

Figure 5A:
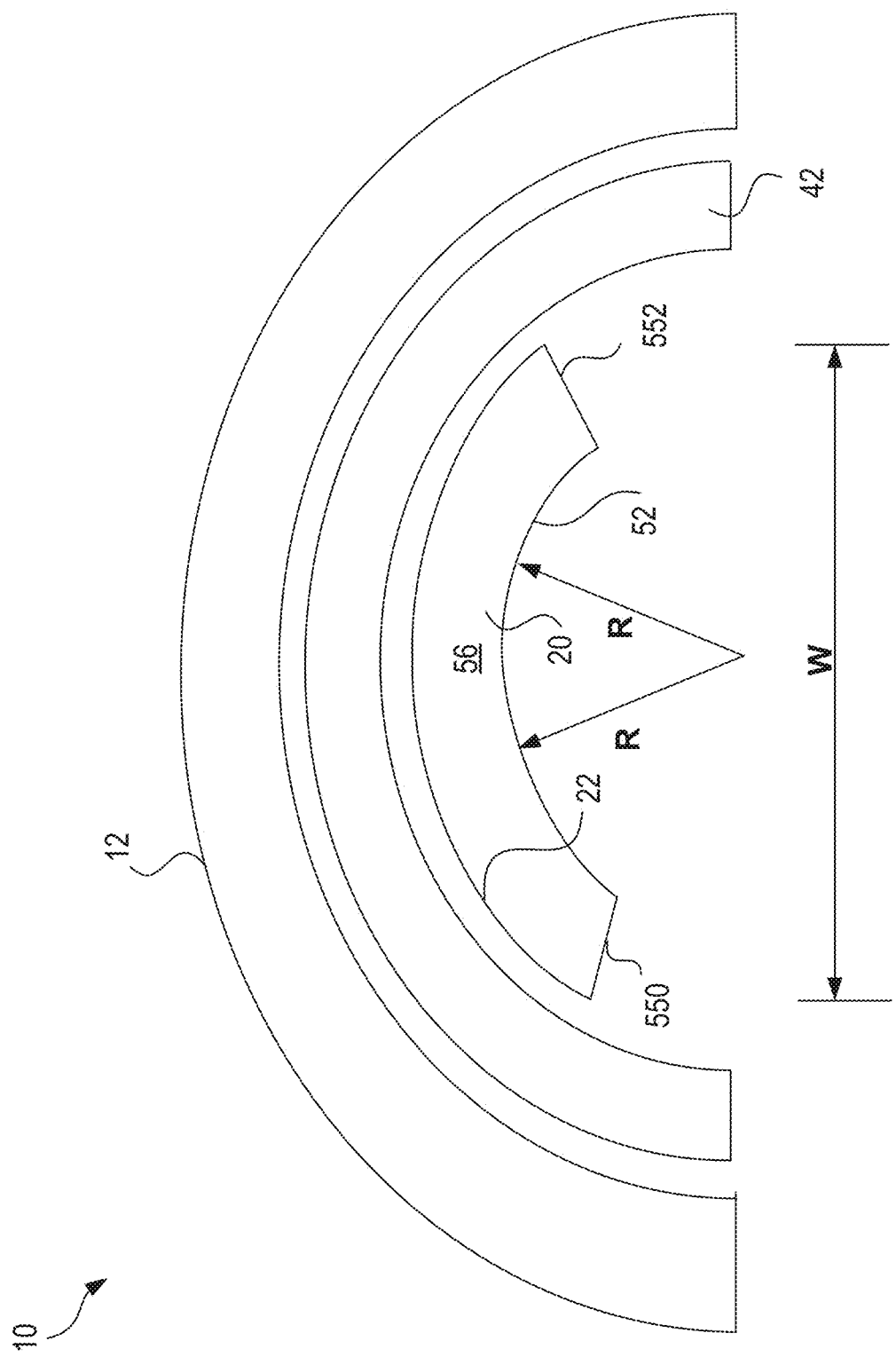
FIG. 5A illustrates, by way of example, a diagram of an embodiment of a curved LGP from a perspective indicated by an arrow labelled "5A" in FIG. 1

FIG. 5A illustrates, by way of example, a diagram of an embodiment of the LOP 10 of FIG. 1 from the perspective indicated by the arrow labelled "5A" in FIG. 1. A length of the LGP is indicated by arrows labelled "L" in FIG. 1. A width of the LOP is indicated by arrows labelled "W" in FIG. 5. A radius of curvature is indicated by arrows labelled "R" in FIG. 5. Generally, $L \geq W$. Generally, R indicates a curve along the W direction (generally perpendicular to L). That is, the curve of the LGP 10 extends from a first side 550 of the LGP 10 to a second side 522 of the LGP 10, The first side 550 and the second side 552 can extend between the surfaces 22 and 152 and extend the length (L) of the LGP 10 between the receiving surface 56 and another receiving surface 21 opposing the receiving surface 56. The backplate 12 and the reflection sheet 42 can include substantially a same R as the LGP 20.

Figure 5B:
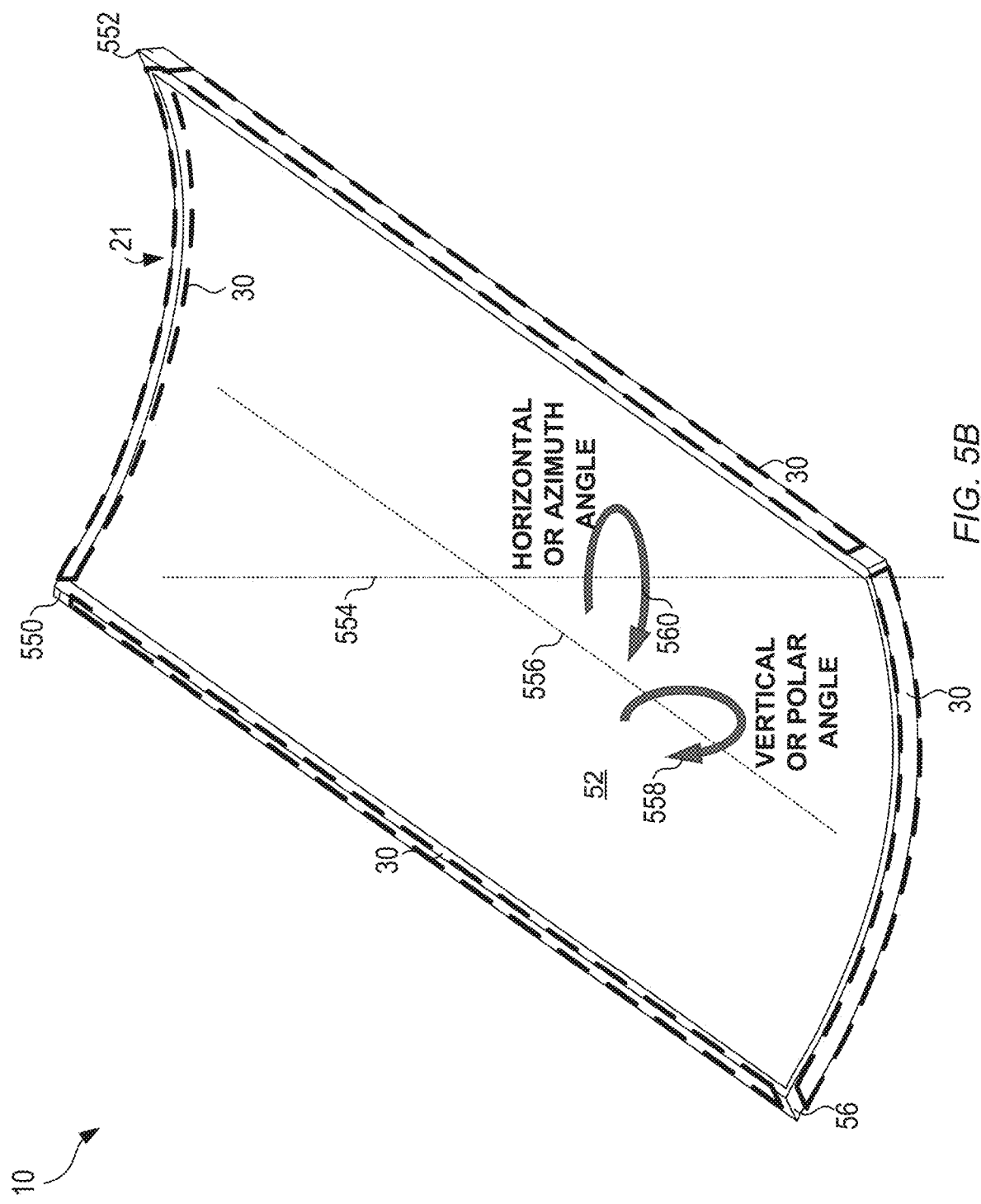
FIG. 5B illustrates, by way of example, a diagram of an embodiment of a curved LOP from a perspective indicated by an arrow labelled "5B" in FIG. 1.

An LGP 20 that includes $L=W$ is said to have a square footprint. An LGP 20 that includes $L=W$ is said to have a rectangular footprint, FIG. 5B illustrates, by way of example, a diagram of an embodiment of the LGP 10 of FIG. 1 from the perspective indicated by the arrow labelled "5B" in FIG. 1. In FIG. 5B LEDs 30 emit light into respective receiving surfaces 21, 56, 550, 552. The lighting unit 10, 40 can include LEDs 30 emitting into one or more of the receiving surfaces 21, 56, 550, 552.

FIG. 5B further illustrates what is meant by vertical and horizontal angles relative to the LGP 10, A z-axis 554 is centered between surfaces 550, 552, 56, and 21 and runs through emitting surface 52 and major surface 22. An x-axis 556 runs perpendicular to the z-axis and bisects a center of the LGP running from the surface 21 to the surface 56. An azimuth angle (sometimes called a horizontal angle 560) indicates a rotational position around the axis 554. A polar angle (sometimes called a vertical angle 558) indicates a rotational position around the axis 556, FIG. 6 illustrates, by way of example, side views of various silhouettes 702, 704, 706, 708, and 710 along the L of an edge lit curved LGP. Shapes can include, are not limited to symmetrically curved (702 and 704), curved with different amounts of curvature (different R), asymmetrically curved (706 and 708), curved along one axis, or curved along two or more axes (e.g., spherical or saddle shaped). Lighting can be provided along one, two, or more edges (e.g., the surface 56, surface 21, side 550, side 552, or a combination thereof). The curved LGPs can be of uniform thickness in cross section, or alternatively can thicken or thin near edges (710). In one embodiment, a concave single curvature that increase peak intensity angle can be used. In other embodiments, a convex single curvature that decrease the peak intensity angle can be used. In still another embodiment, concave paraboloid shapes (like a shallow bowl) can be used to increase the peak angle of batwing distributions for outdoors applications, without penalty efficiency.

The following intensity diagrams in FIGS. 7-20 and 22-33 regard intensity slices in which a y-axis is parallel with the longitudinal axis 18, an x-axis is perpendicular to the longitudinal axis 18 along the street, and a z-axis extends along the structure 312 (see FIG. 3). The intensity slices for FIGS. 7-20 regard an LGP with a rectangular footprint in which $L=2W$. The intensity slices for FIGS. 22-33 regard an LGP with a square footprint in which $L=W$.

Figures 7, 8:
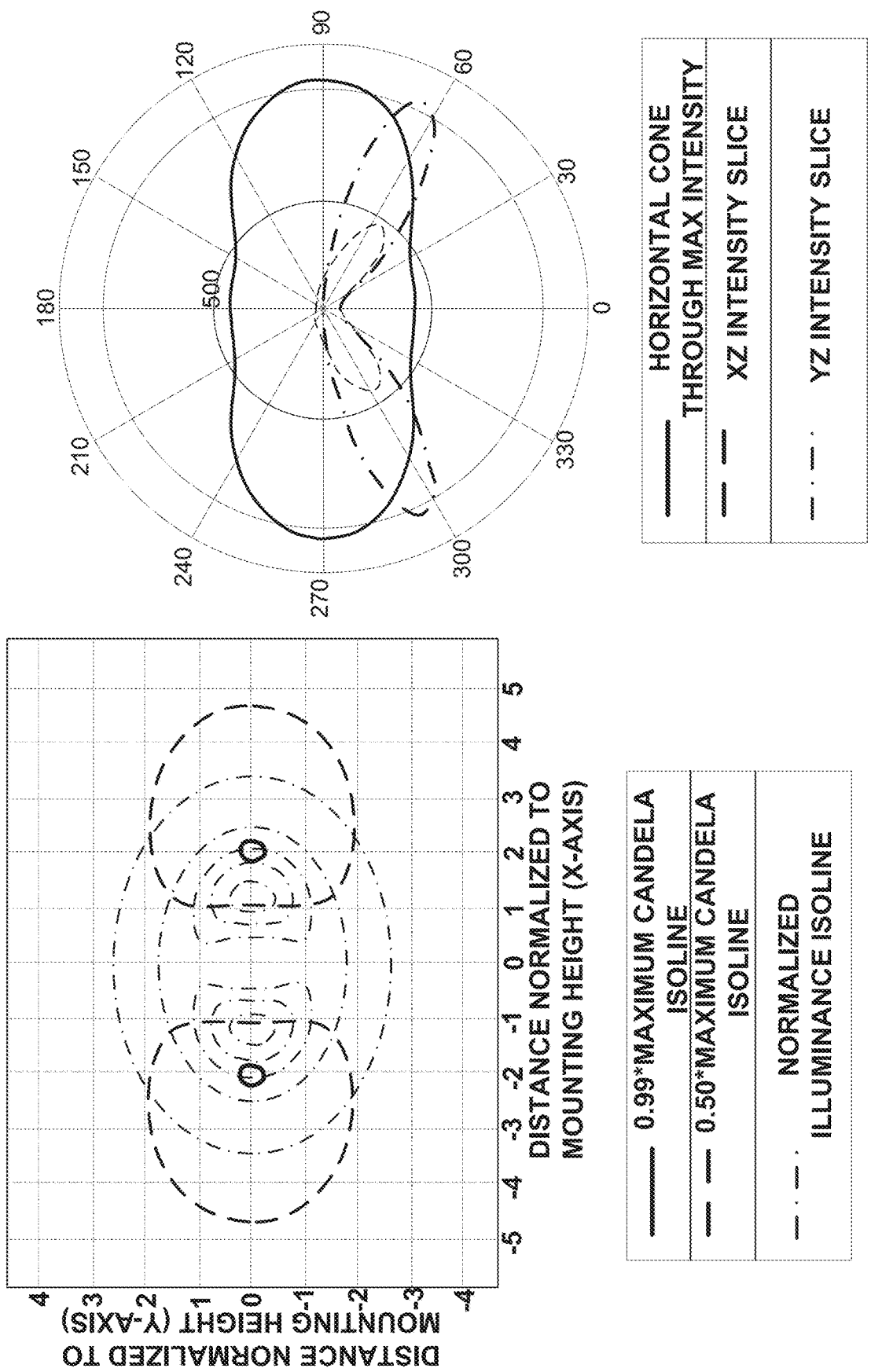
FIGS. 7-8 illustrate, by way of example, intensity diagrams for an LOP with a rectangular footprint and a radius of curvature of 0.02 m$^{-1}$.
Figures 9, 10:
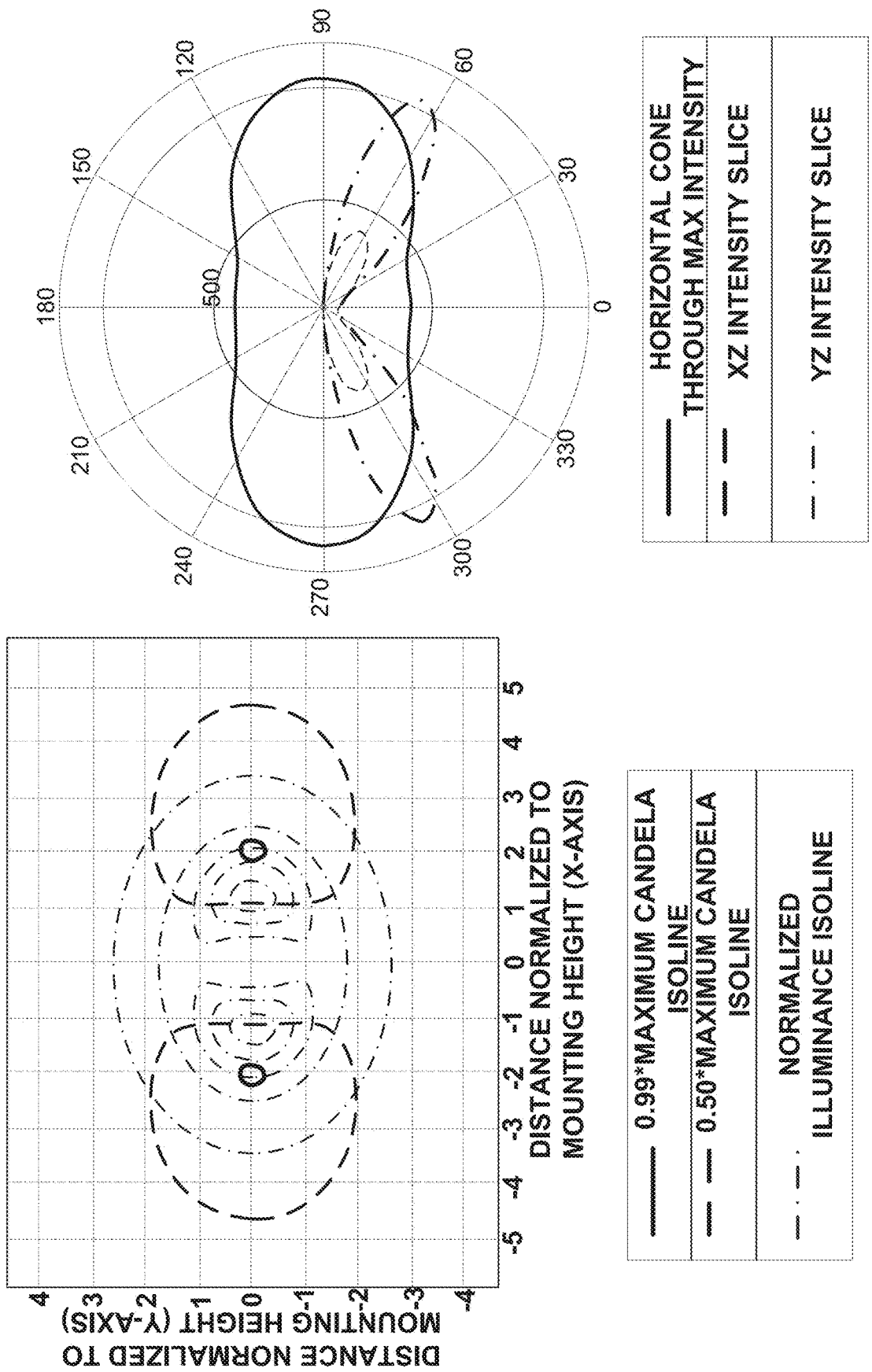
FIGS. 9-10 illustrate, by way of example, intensity diagrams fix an LOP with a rectangular footprint and a radius of curvature of 1.98 m$^{-1}$.
Figures 11, 12:
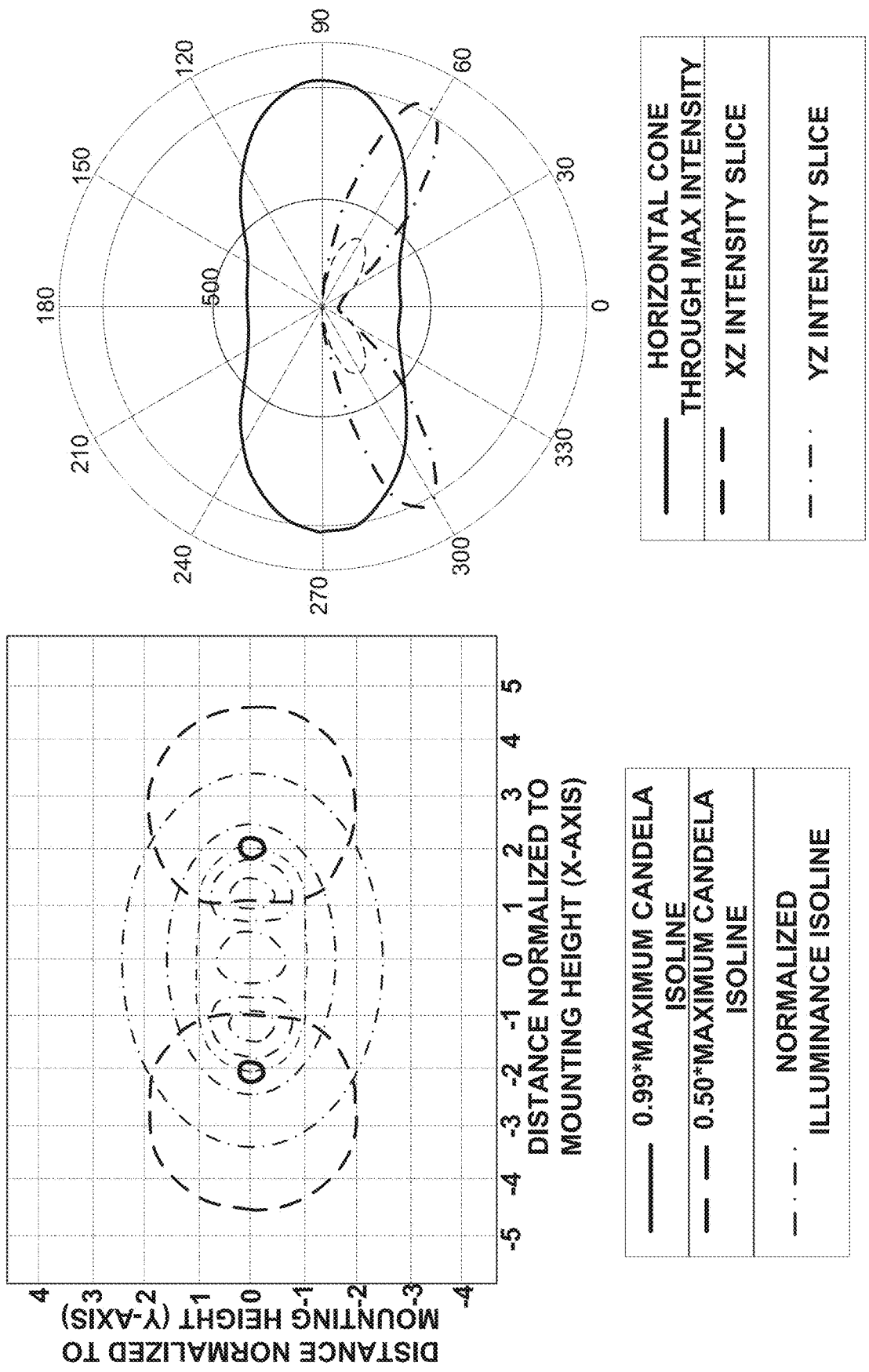
FIGS. 11-12 illustrate, by way of example, intensity diagrams for an LGP with a rectangular footprint and a radius of curvature of 3.85 m$^{-1}$.
Figures 13, 14:
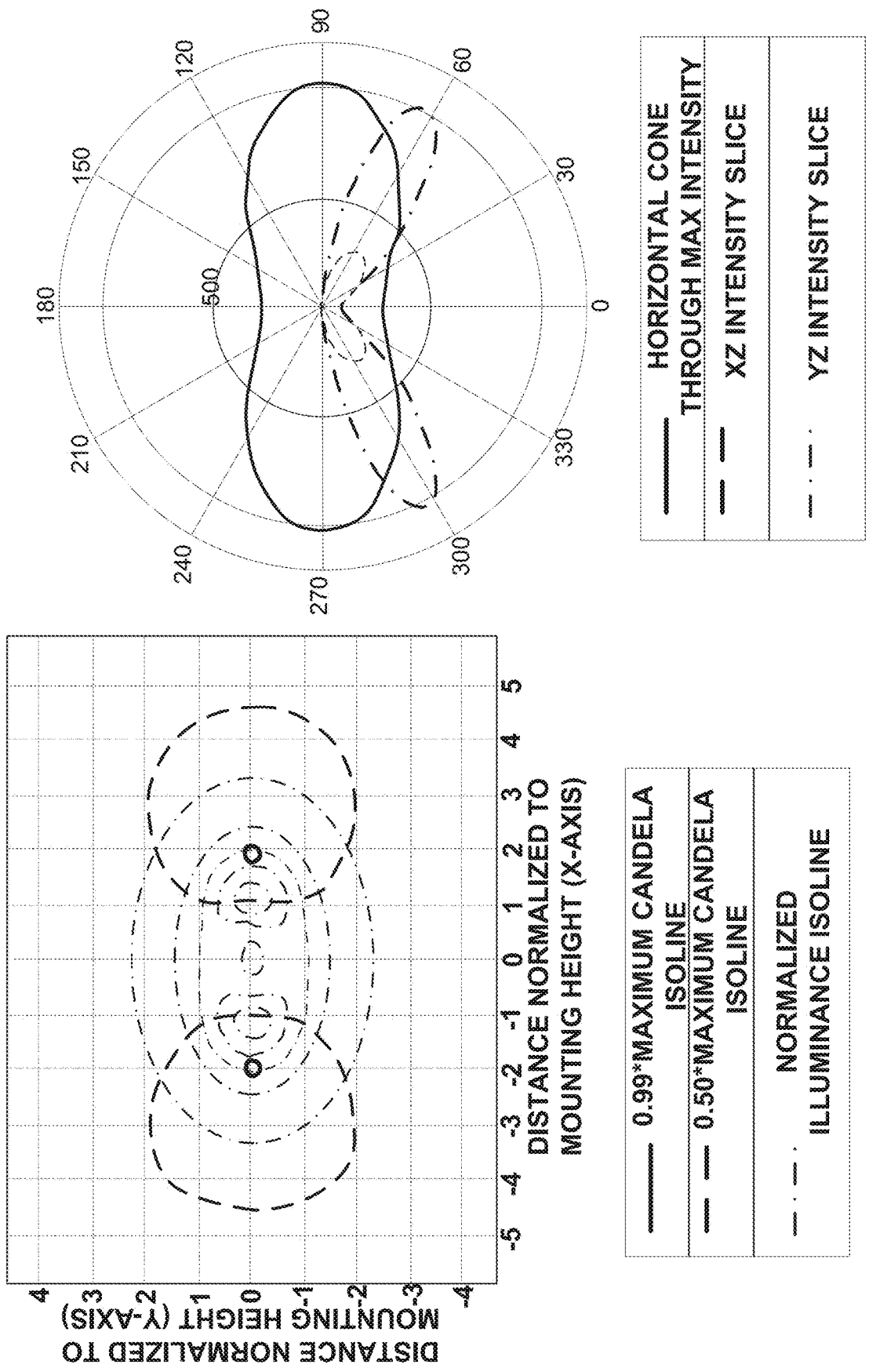
FIGS. 13-14 illustrate, by way of example, intensity diagrams for an LOP with a rectangular footprint and a radius of curvature of 5.5 m$^{-1}$.
Figures 15, 16:
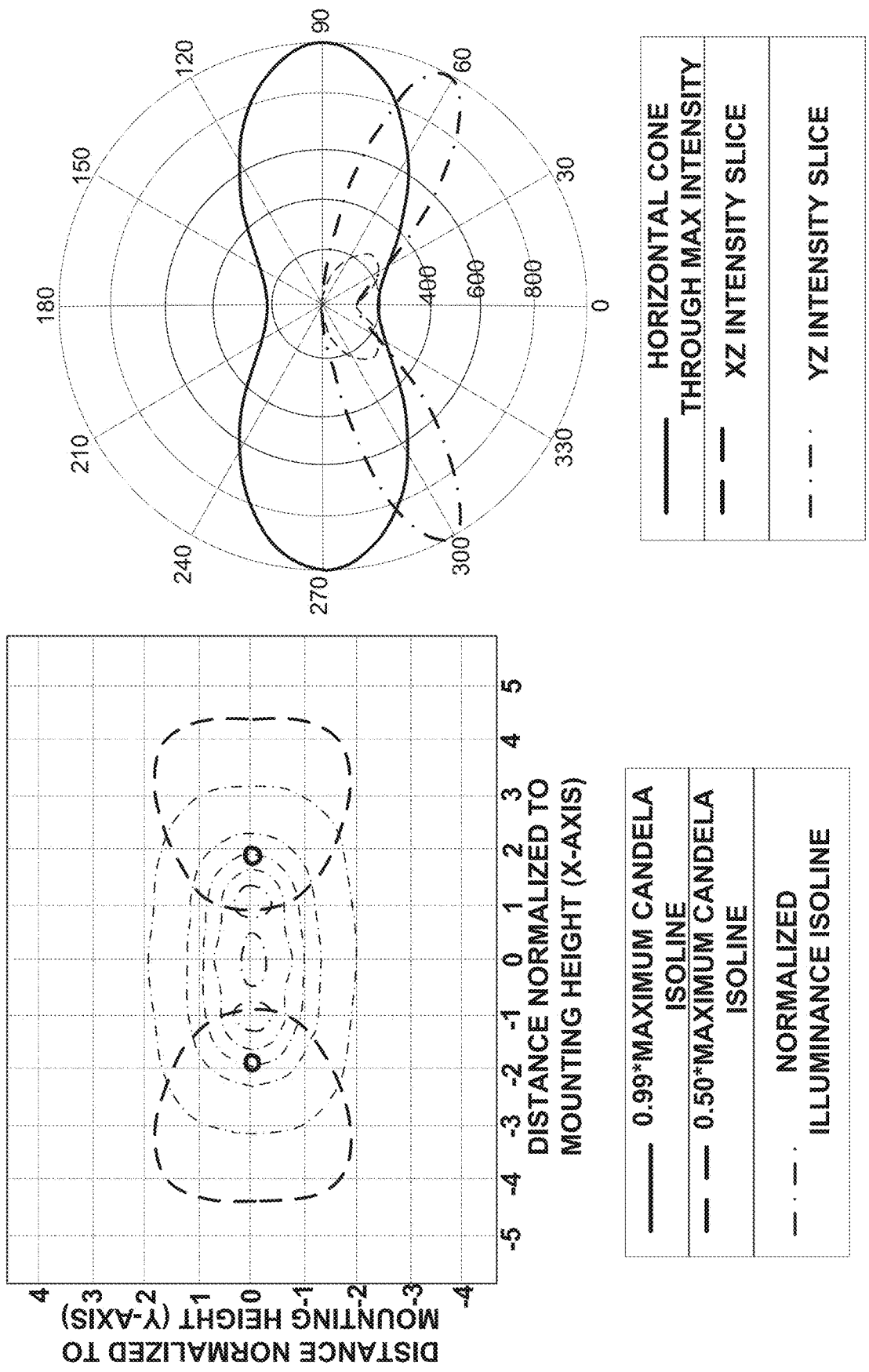
FIGS. 15-16 illustrate, by way of example, intensity diagrams for an LGP with a rectangular footprint and a radius of curvature of 6.9 m$^{-1}$.
Figures 17, 18:
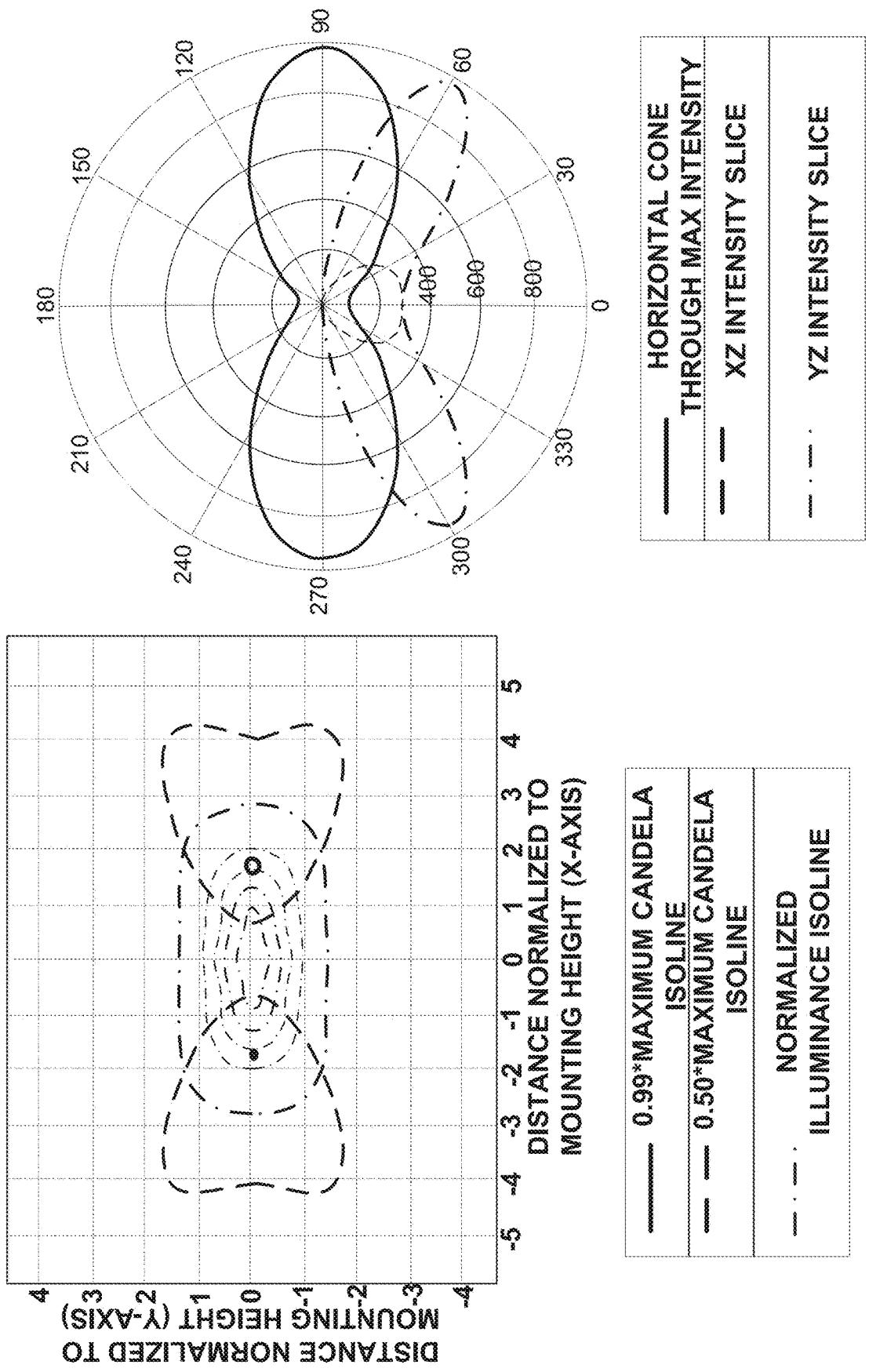
FIGS. 17-18 illustrate, by way of example, intensity diagrams for an LOP with a rectangular footprint and a radius of curvature of 8.8 m$^{-1}$.
Figures 19, 20:
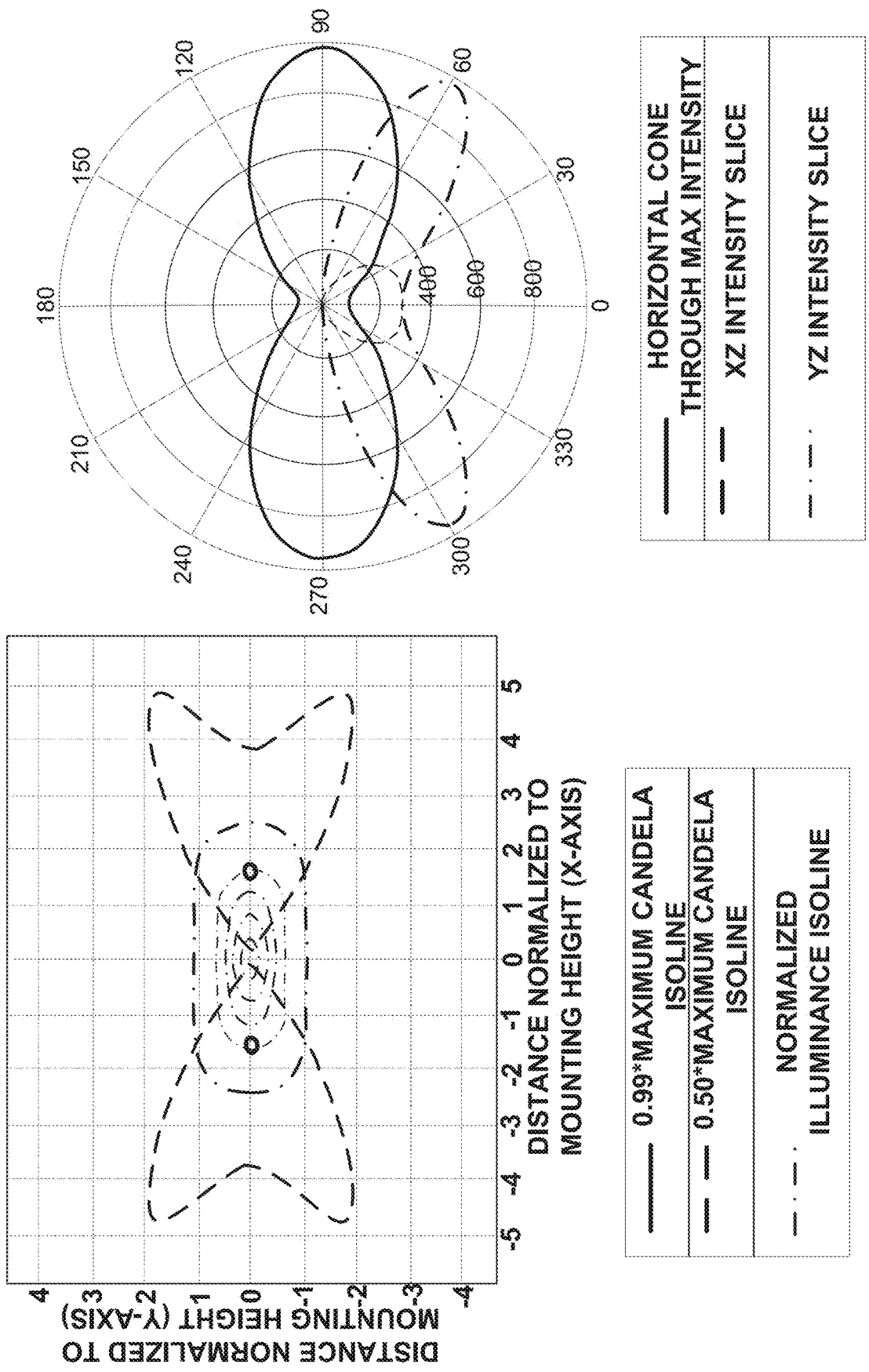
FIGS. 19-20 illustrate, by way of example, intensity diagrams for an LGP with a rectangular footprint and a radius of curvature of 9.9 m$^{-1}$.

FIGS. 7-8 illustrate, by way of example, intensity diagrams for an LGP with a rectangular footprint and a radius of curvature of 0.02 $m^{-1}$. FIGS. 9-10 illustrate, by way of example, intensity diagrams for an LGP with a rectangular footprint and a radius of curvature of 1.98 $m^{-1}$. FIGS. 11-12 illustrate, by way of example, intensity diagrams for LGP with a rectangular footprint and a radius of curvature of 3.85 $m^{-1}$. FIGS. 13-14 illustrate, by way of example, intensity diagrams for an LGP with a rectangular footprint and a radius of curvature of 5.5 $m^{-1}$. FIGS. 15-16 illustrate, by way of example, intensity diagrams for LGP with a rectangular footprint and a radius of curvature of 6.9 $m^{-1}$. FIGS. 17-18 illustrate, by way of example, intensity diagrams for an LOP with a rectangular footprint and a radius of curvature of 8.8 $m^{-1}$. FIGS. 19-20 illustrate, by way of example, intensity diagrams for an LGP with a rectangular footprint and a radius of curvature of 9.9 $m^{-1}$.

Figure 21:
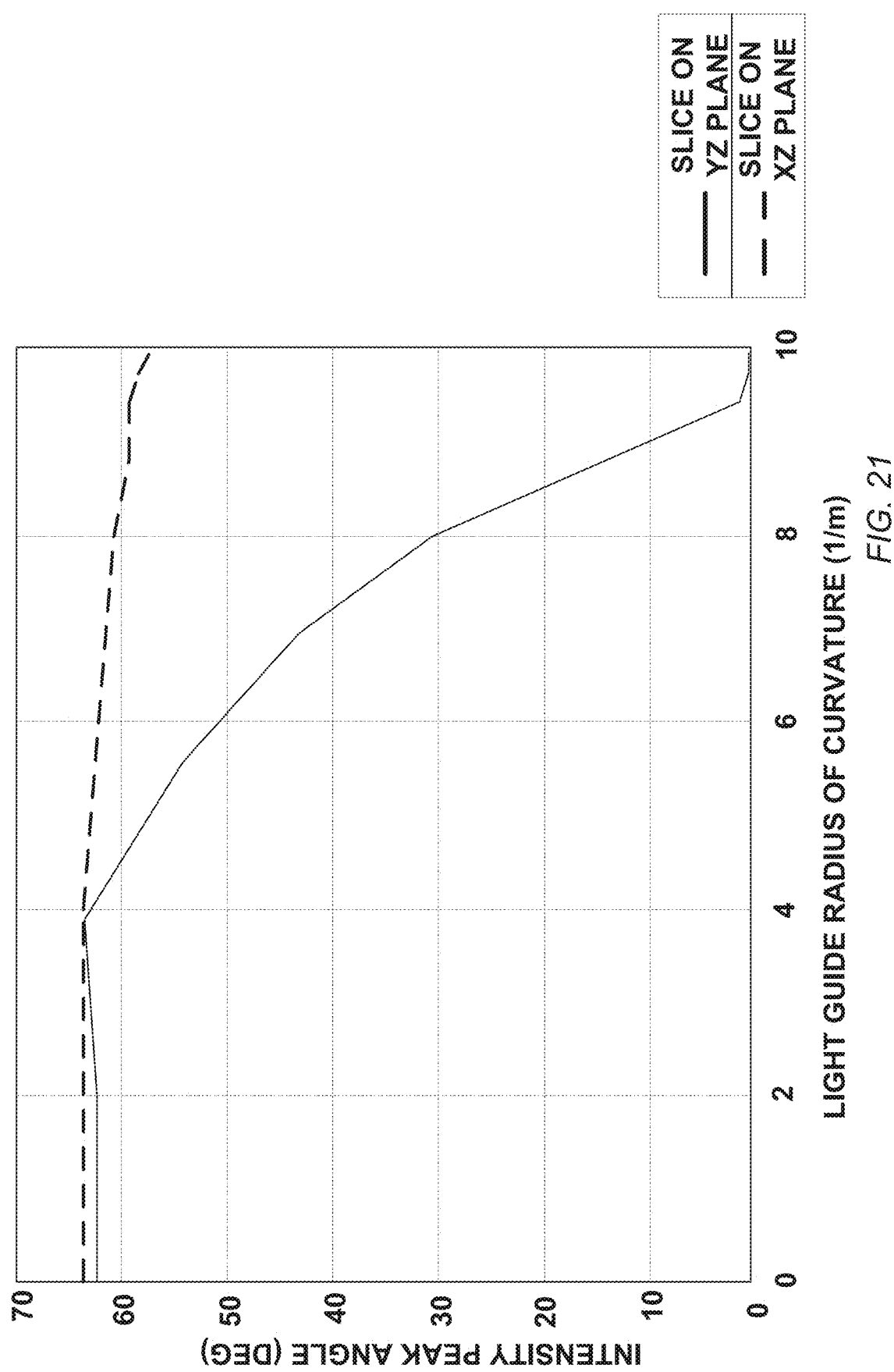
FIG. 21 illustrates, by way of example, angle of peak intensity versus radius of curvature for the rectangular LGP of FIGS. 7-20.

FIG. 21 illustrates, by way of example, angle of peak intensity versus radius of curvature for the rectangular LOP of FIGS. 7-20. As can be seen, the radius of curvature (R) of has little effect on the angle of peak intensity in the xz plane, while the R has a large effect on the angle of peak intensity in the YZ plane. By increasing R, the angle decreases (gets closer to directly below the LGP 20).

Figures 22, 23:
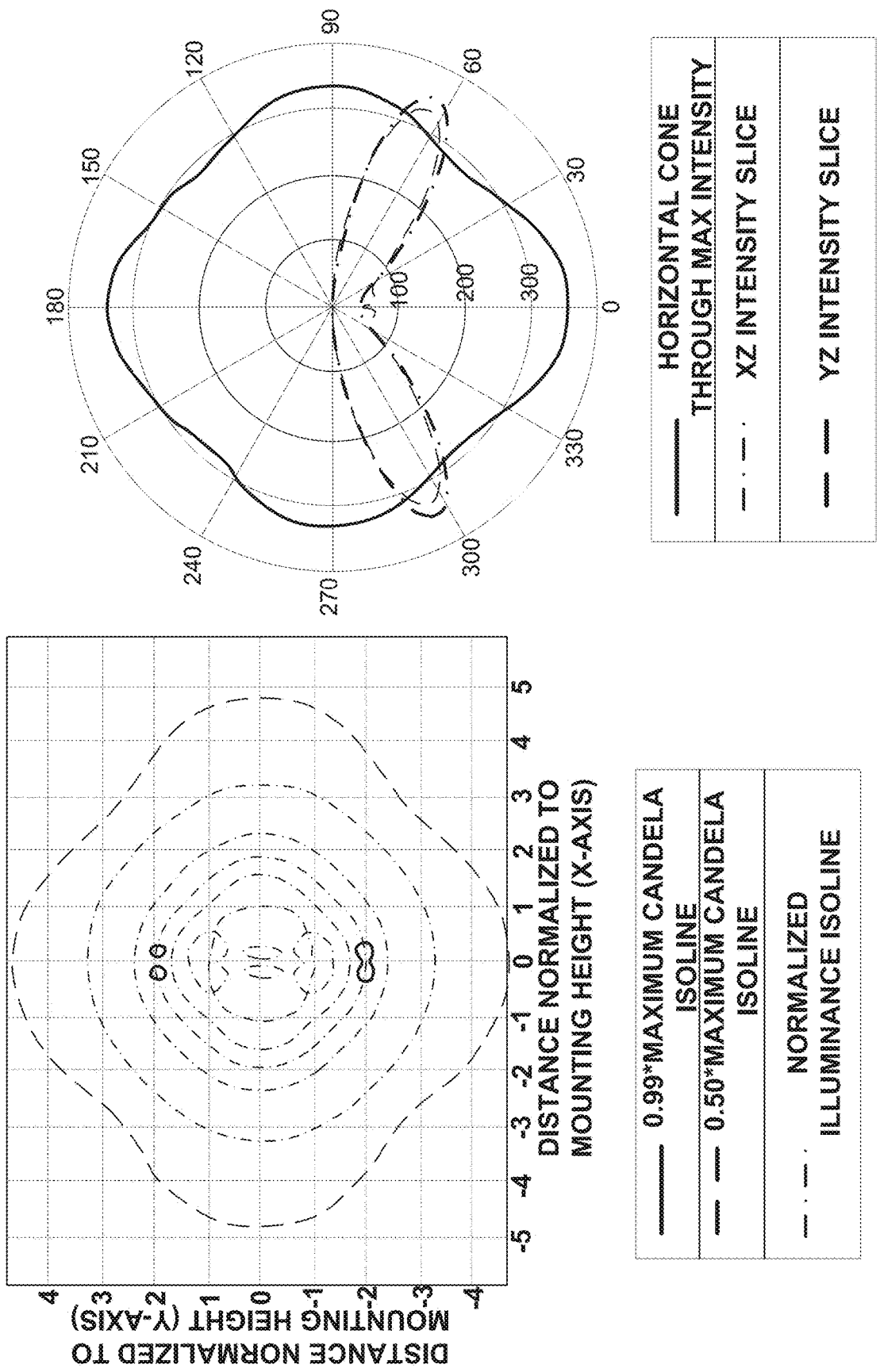
FIGS. 22-23 illustrate, by way of example, intensity diagrams for an LGP with a square footprint and a radius of curvature of 0.02 m$^{-1}$.
Figure 25:
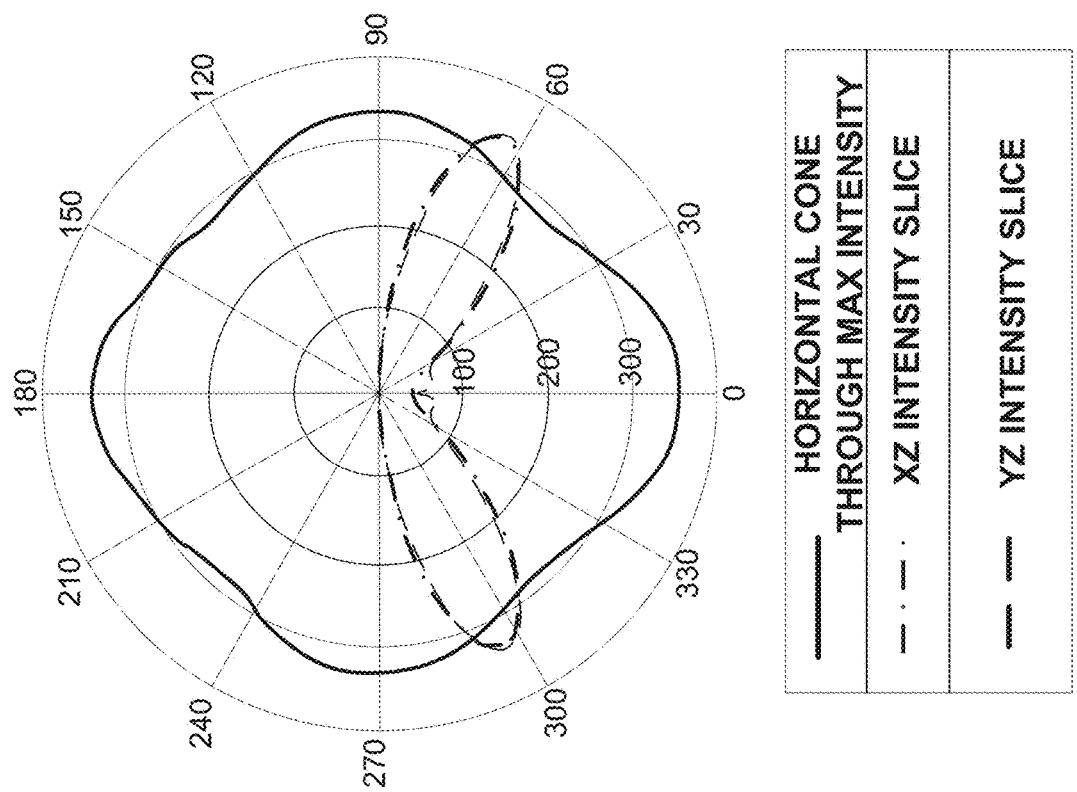
FIGS. 24-25 illustrate, by way of example, intensity diagrams for an LOP with a square footprint and a radius of curvature of 1.98 m$^{-1}$.
Figure 24:
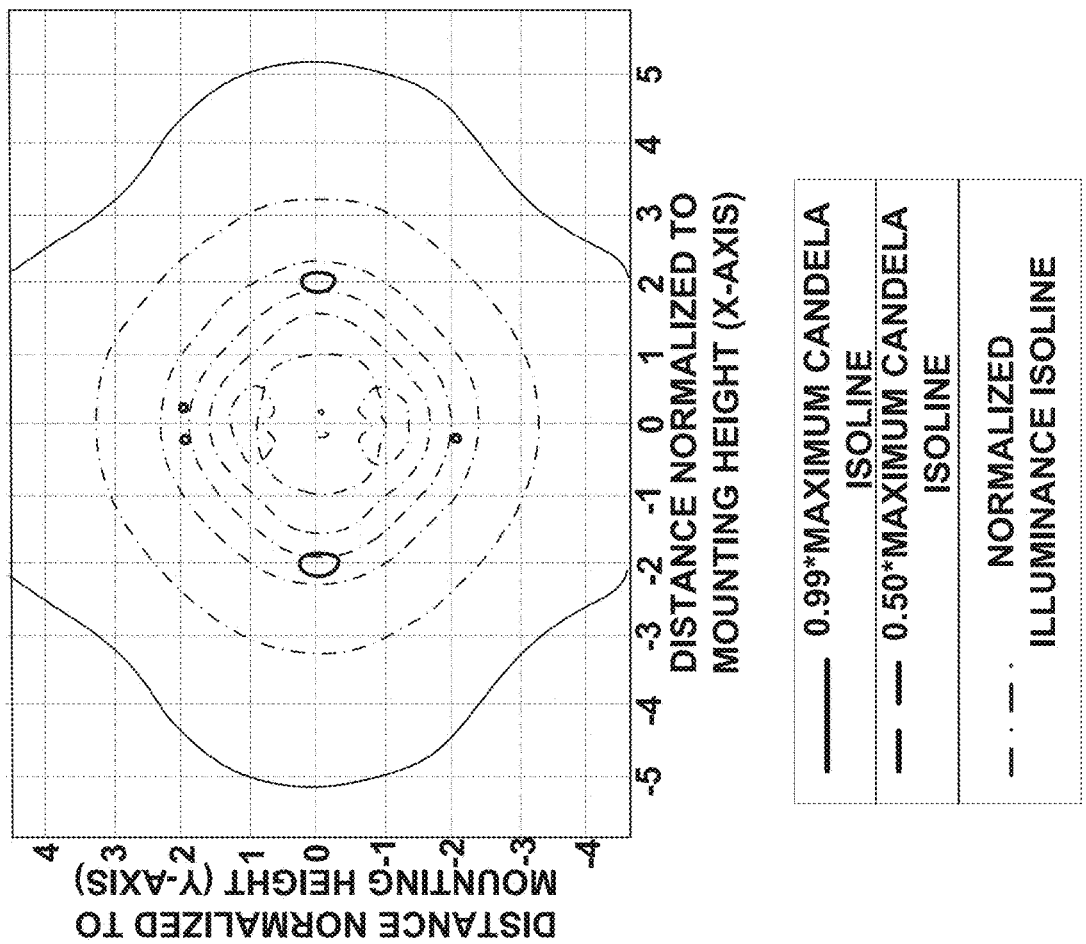
Figures 26, 27:
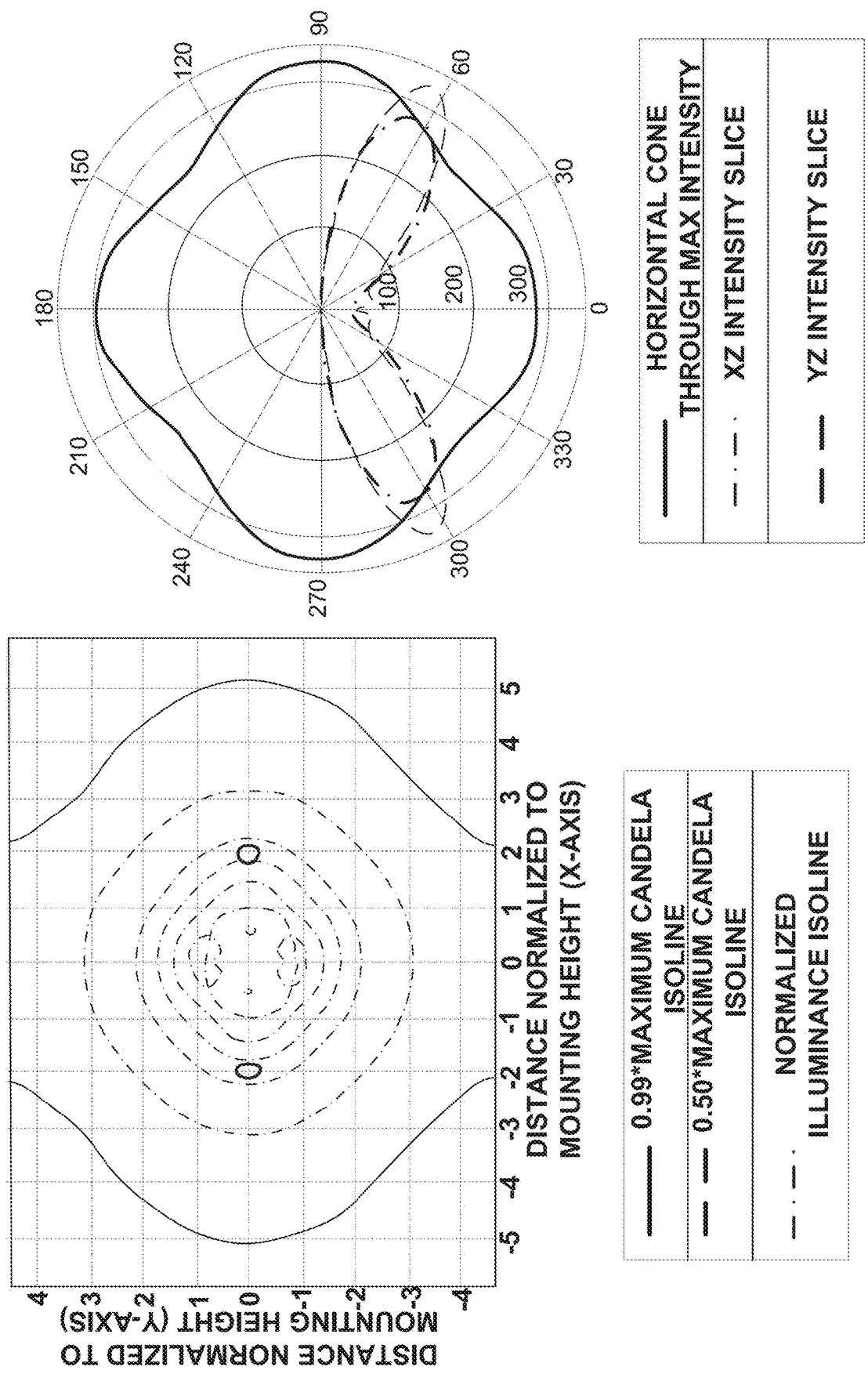
FIGS. 26-27 illustrate, by way of example, intensity diagrams for an LGP with a square footprint and a radius of curvature of 3.85 m$^{-1}$.
Figures 28, 29:
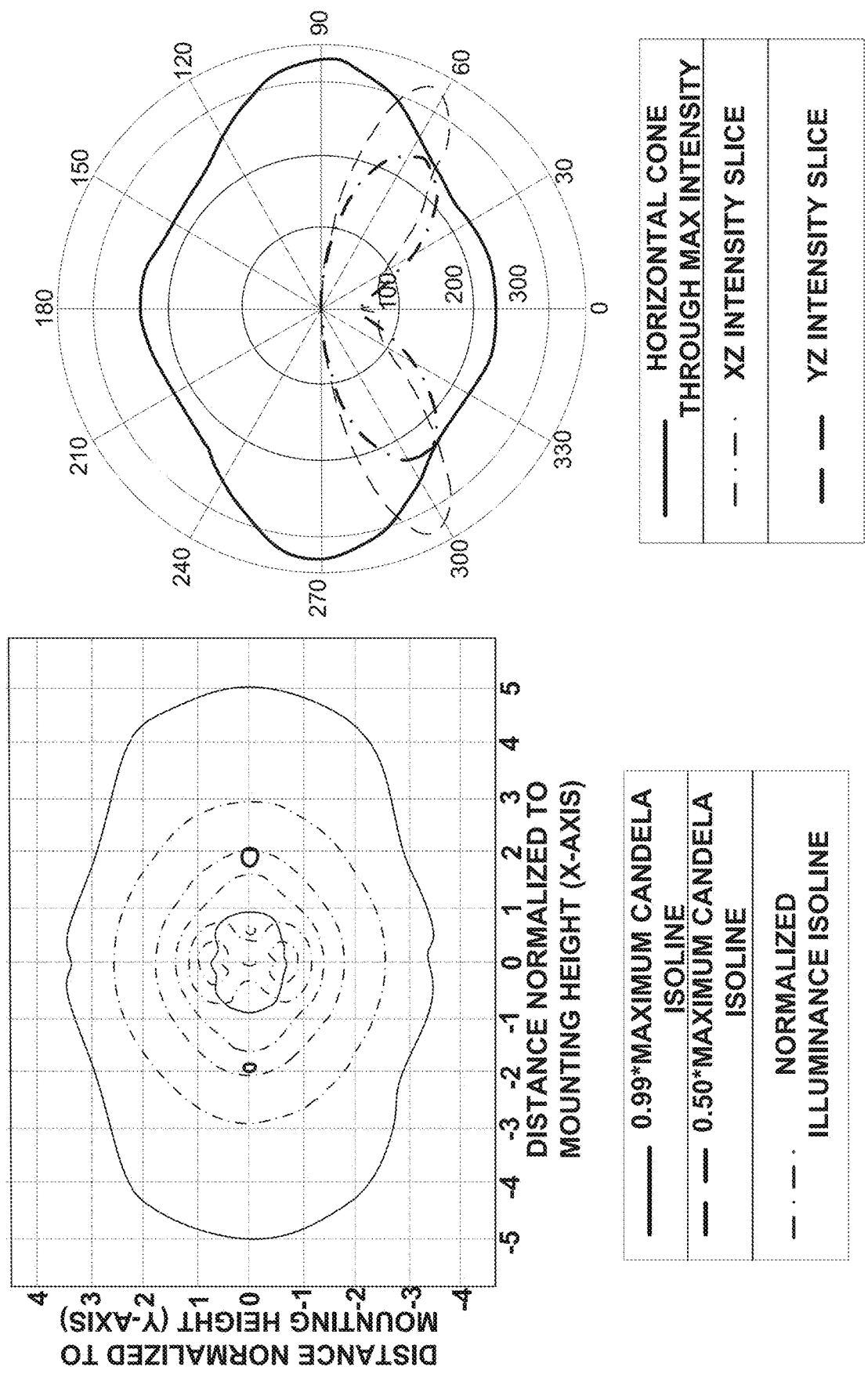
FIGS. 28-29 illustrate, by way of example, intensity diagrams for an LGP with a square footprint and a radius of curvature of 5.5 m$^{-1}$.
Figures 30, 31:
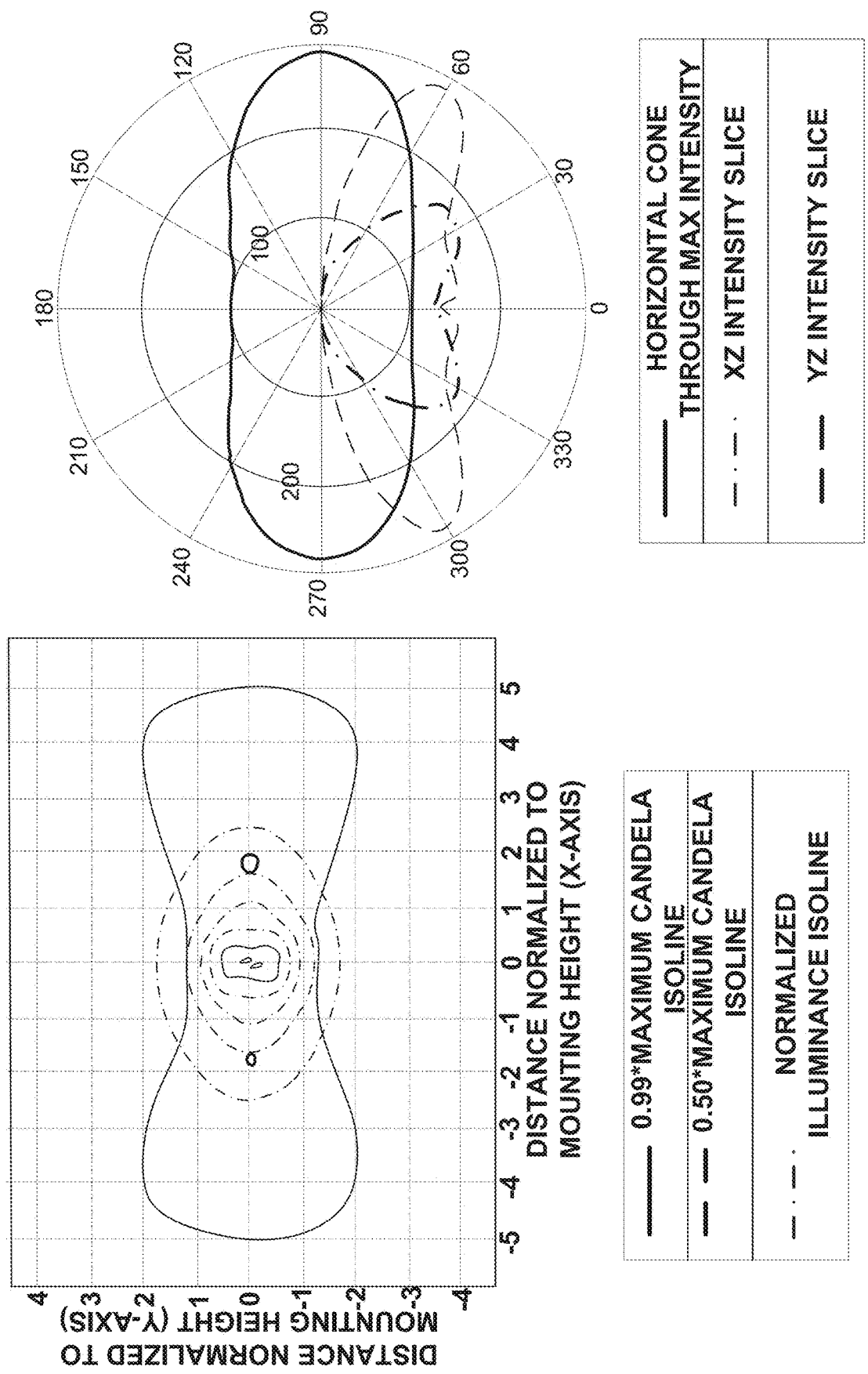
FIGS. 30-31 illustrate, by way of example, intensity diagrams for an LOP with a square footprint and a radius of curvature of 8.0 m$^{-1}$.
Figures 32, 33:
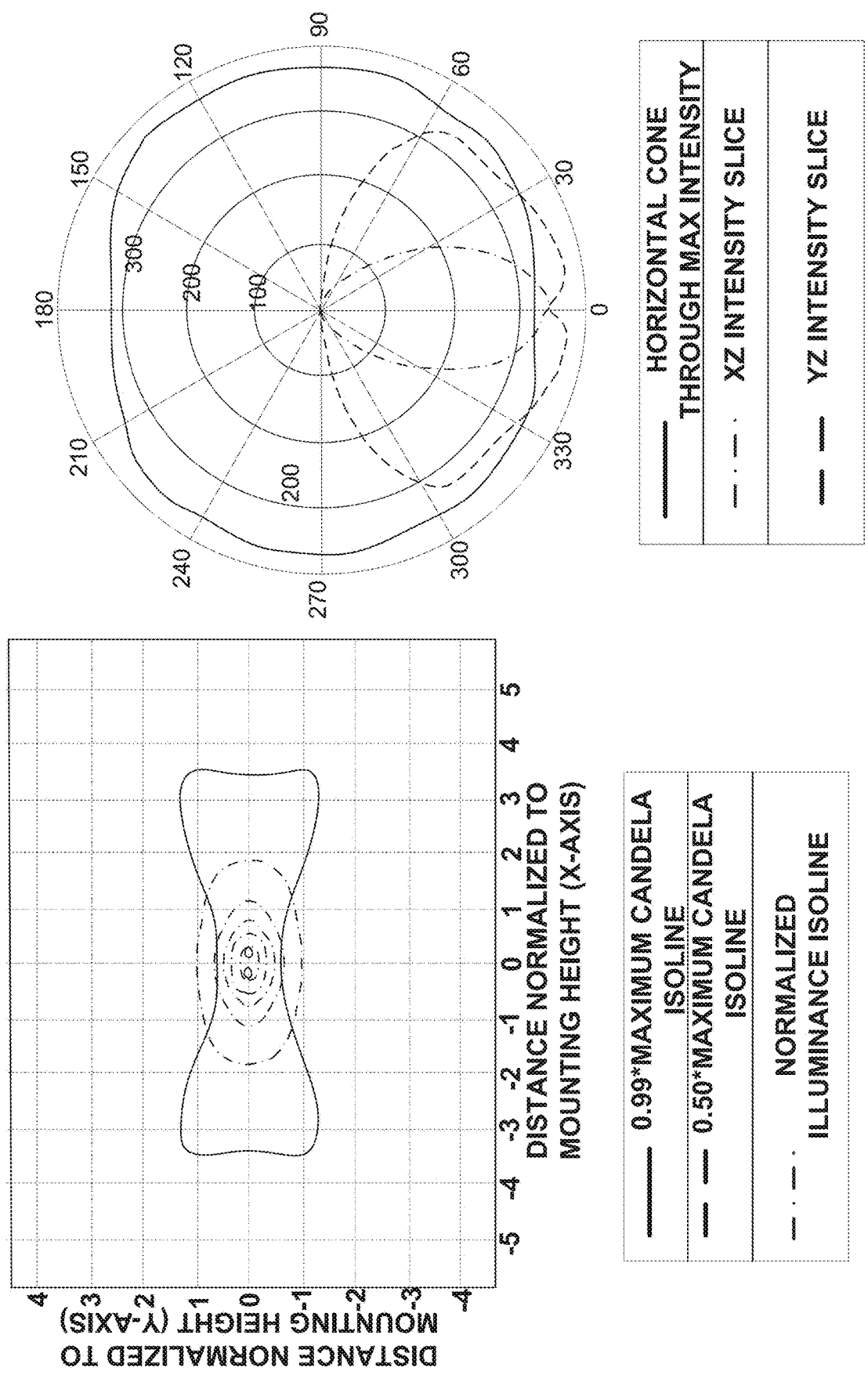
FIGS. 32-33 illustrate, by way of example, intensity diagrams for an LGP with a square footprint and a radius of curvature of 9.9 m$^{-1}$.

FIGS. 22-23 illustrate, by way of example, intensity diagrams for an LGP with a square footprint and a radius of curvature of 0.02 $m^{-1}$. FIGS. 24-25 illustrate, by way of example, intensity diagrams for an LOP with a square footprint and a radius of curvature of 1.98 $m^{-1}$. FIGS. 26-27 illustrate, by way of example, intensity diagrams for an LGP with a square footprint and a radius of curvature of 3.85 $m^{-1}$. FIGS. 28-29 illustrate, by way of example, intensity diagrams for an LGP with a square footprint and a radius of curvature of 5.5 $m^{-1}$. FIGS. 30-31 illustrate, by way of example, intensity diagrams for an LGP with a square footprint and a radius of curvature of 8.0 $m^{-1}$. FIGS. 32-33 illustrate, by way of example, intensity diagrams for an LGP with a square footprint and a radius of curvature of 9.9 $m^{-1}$.

Figure 34:
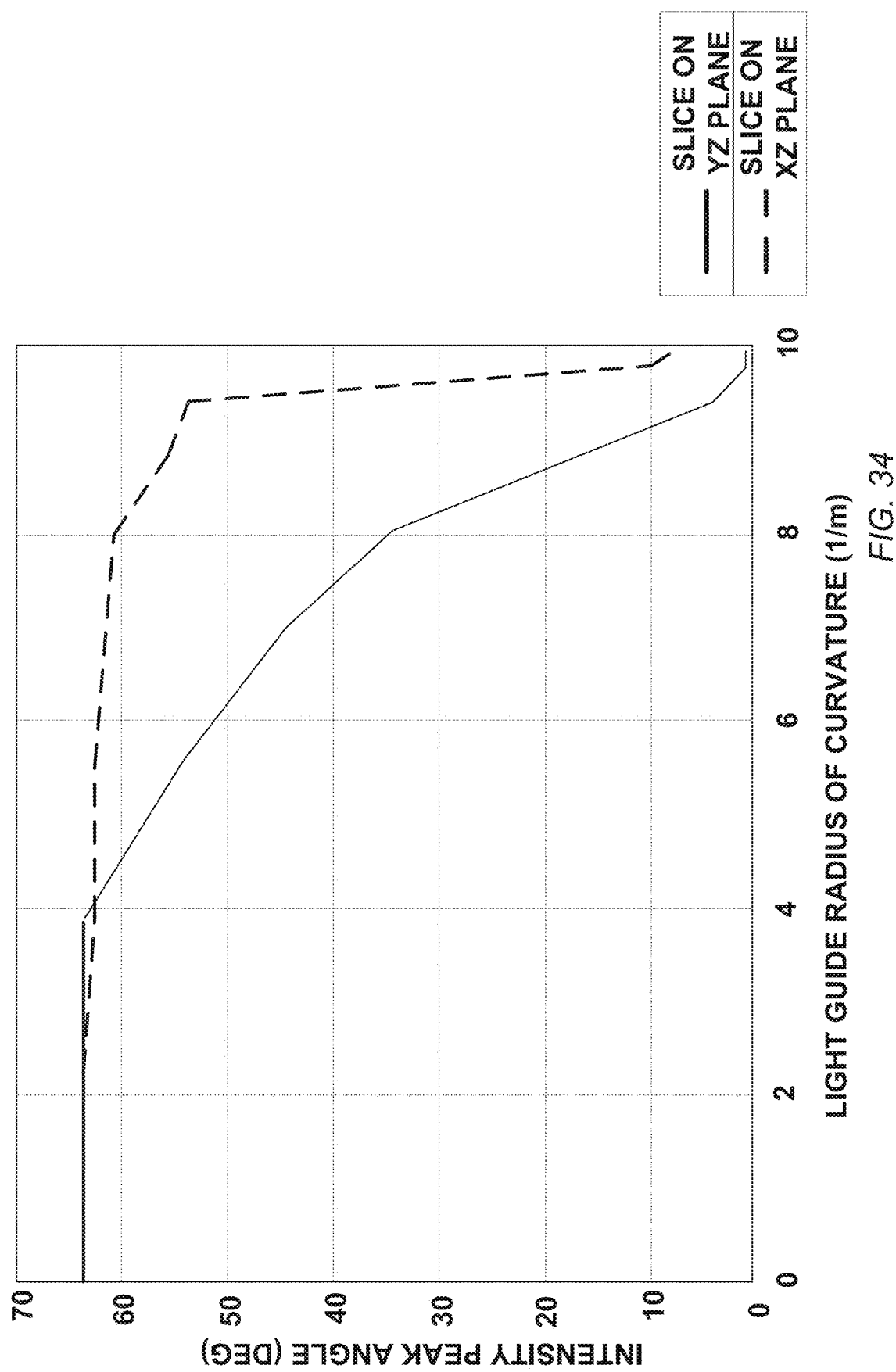
FIG. 34 illustrates, by way of example, angle of peak intensity versus radius of curvature for the LGP with square footprint of FIGS. 22-33.

FIG. 34 illustrates, by way of example, angle of peak intensity versus radius of curvature for the LOP with square footprint of FIGS. 22-33. As compared to FIG. 21, which shows the peak intensity angle versus R for an LGP with rectangular footprint, the R of the LGP of the square footprint has a greater effect on the angle of peak intensity in the xz plane. This is shown with the R of the LOP greater than 8.

As can be seen in the distributions of FIGS. 7-20 and 22-33, a light distribution peak angle using a curved LGP can be variable vs horizontal angle. This is in contrast to conventional planar LGPs that commonly produce light distributions with constant vertical peak angle as a function of horizontal angle. Such light distributions do not require integrating non-rotationally-symmetric scattering features or textures into the LGP 20, which is typically hard to design and costly to fabricate.

Figure 35:
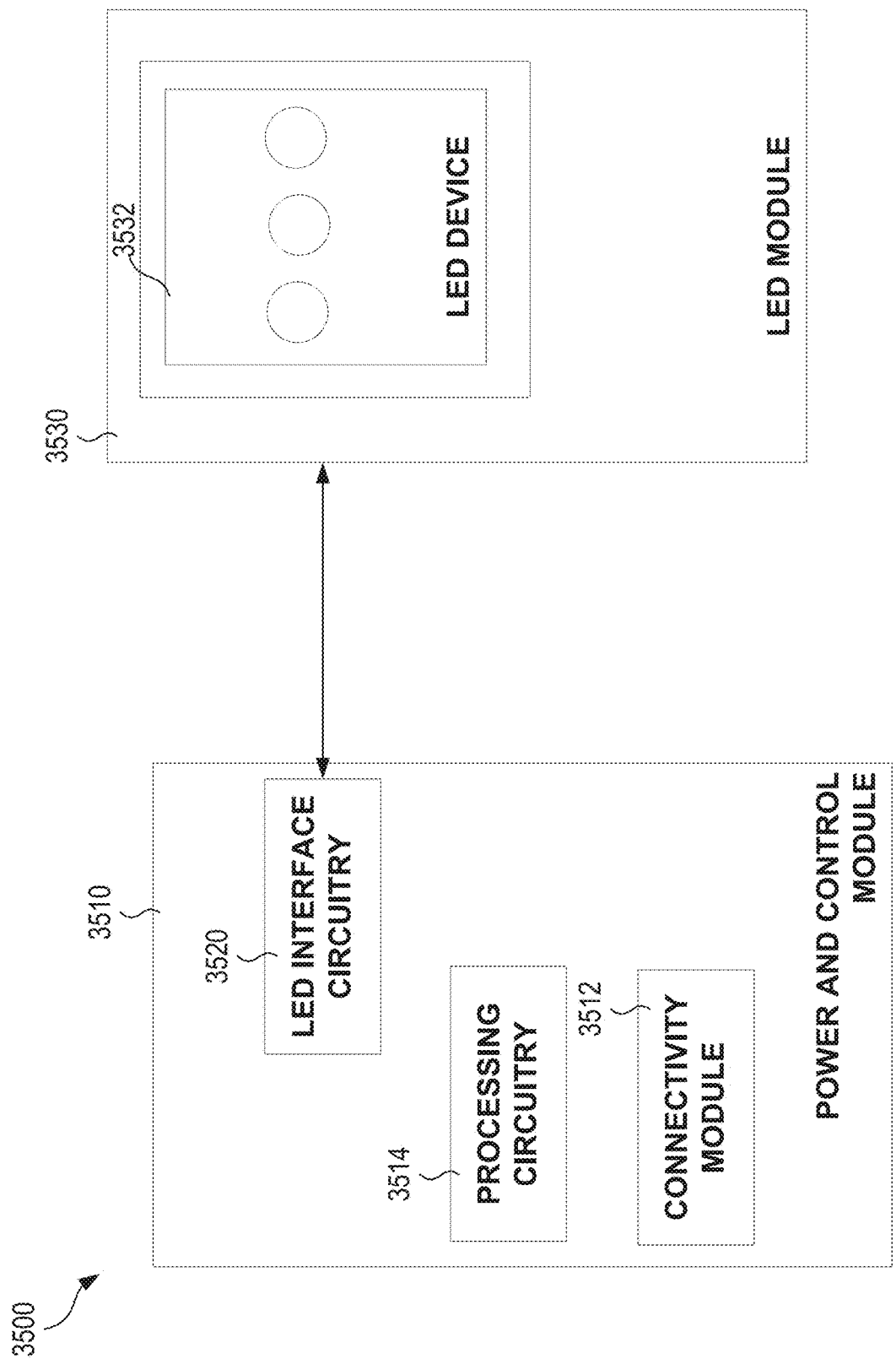
FIG. 35 illustrates, by way of example, a diagram of an embodiment of a lighting and control system.

Advantageously, using LGPs with standard scattering features and the addition of curvature allows tuning the light intensity angular distribution and varying the distribution vertical peak angle as a function of horizontal angle. This enables a new and low cost optical design tool for this class of optics to produce asymmetric light distributions with a distribution peak angle that is not constant versus horizontal angle (longitude angle). Also shown in the intensity distributions that a batwing distribution peak angle is no longer constant vs horizontal angle (longitude angle). This leads to a more rectangular-shaped illuminated area from such luminaire, FIG. 35 illustrates a power and LED control unit 3500 suitable for controlling a lighting unit, such as described herein. As seen in FIG. 35, a control unit 3500 includes a power and control module 3510 that includes a connectivity module 3512 and processing circuitry 3514. The connectivity module 3512 can include wireless or wired connection for user or automatic control via the processing circuitry 3514. In some embodiments, wirelessly connected tablets or smart phones with lighting apps installed can be used to provide lighting control and determine lighting status (e.g. lights on or off, Control and power is provided to LED device 3532 in an LED module 3530 via LED interface circuitry 3520.

The power and LED control unit 3500 includes circuitry to enable the operation of the plurality of LEDs. Furthermore, the LED circuit boards of the LED module or LED device 3532 can include the necessary circuitry so as to enable individual or grouped operation of the plurality LEDs in LED device 3532. In some embodiments, each LED can be separately controlled by controller, while in other embodiments groups of LEDs can be controlled as a block. In still other embodiments, both single LEDs and groups of LEDs can be controlled. In one embodiment, intensity can be separately controlled and adjusted by setting appropriate ramp times and pulse width for each LED using a pulse width modulation module control unit 3500. This allows staging of LED activation to reduce power fluctuations, and to provide superior luminous intensity control.

Many modifications and other embodiments will come to the mind of one skilled in the art having the benefit of the teachings presented in the foregoing descriptions and the associated drawings. Therefore, it is understood that the embodiments are not to be limited to the specific embodiments disclosed, and that modifications and embodiments are intended to be included within the scope of the appended claims. It is also understood that other embodiments may be practiced in the absence of an element/step not specifically disclosed herein.

The invention claimed is:

1. A streetlight luminaire comprising:
    a curved light guide plate including:
        a first receiving surface;
        an emitting surface;
        a major surface opposing the emitting surface;
        second and third receiving surfaces on a streetside of the streetlight luminaire and an opposing house side of the streetlight luminaire, respectively, the first receiving surface extending in a first dimension between the major surface and the emitting surface, the first receiving surface, the emitting surface, and the major surface extending in a second dimension between the second and third receiving surfaces, the first dimension perpendicular to the second dimension, the first receiving surface, emitting surface, and major surface including a positive, non-zero radius of curvature (R) in the first dimension and the second and third receiving surfaces including an infinite radius of curvature in the first and second dimensions; and
    a plurality of LEDs positioned to emit light into three or more of the first receiving surface, second receiving surface, third receiving surface, or a fourth receiving surface, the fourth receiving surface opposing the first receiving surface.

2. The streetlight luminaire of claim 1, wherein the first receiving surface, fourth receiving surface, emitting surface, and major surface are symmetric about a first axis longitudinally bisecting the emitting surface.

3. The streetlight luminaire of claim 1, wherein the emitting surface and major surface include two portions with different, non-zero radius of curvatures in the second dimension.

4. The streetlight luminaire of claim 1, wherein light emitted out the emitting surface provides a generally rectangular light distribution.

5. The streetlight luminaire of claim 1, further comprising light diffusing features on the major surface.

6. The streetlight luminaire of claim 5, wherein the diffusing features include Gaussian dots distributed on the major surface.

7. The streetlight luminaire of claim 5, wherein the light diffusing features are epoxy dots distributed on the major surface.

8. The streetlight luminaire of claim 5, wherein the light diffusing features diffuse an incident light ray along a direction of the incident light ray and provide a half width, half maximum (HWHM) light spread of between about 6 and 18 degrees centered around the direction of the impinging light ray.

9. The streetlight luminaire of claim 5, wherein the light diffusing features are printed or molded on the major surface.

10. The streetlight luminaire of claim 1, further comprising wherein a light emission from the emitting surface provides a distribution peak angle that is variable relative to a horizontal angle.

11. A streetlight lighting system, comprising:
    a curved light guide plate including:
        a first receiving surface;
        an emitting surface;
        a major surface opposing the emitting surface;
        second and third receiving surfaces on a streetside of the curved light guide plate and an opposing house side of the curved light guide plate, respectively, the first receiving surface extending in a first dimension between the major surface and the emitting surface, the first receiving surface, the emitting surface, and the major surface extending in a second dimension between the second and third receiving surfaces, the first dimension perpendicular to the second dimension, the first receiving surface, emitting surface, and major surface including a positive, non-zero radius of curvature (R) in the first dimension and the second and third receiving surfaces including an infinite radius of curvature in the first and second dimensions;
    a plurality of LEDs positioned to emit light into three or more of the first receiving surface, second receiving surface, third receiving surface, or a fourth receiving surface, the fourth receiving surface opposing the first receiving surface;

a reflective surface positioned to direct all light transmitted through the major surface towards the emitting surface; and a light emitting diode (LED) controller electrically coupled to the plurality of LEDs.

12. The streetlight lighting system of claim 11, wherein the first receiving surface, fourth receiving surface, emitting surface, and major surface are symmetric about a first axis longitudinally bisecting the emitting surface.

13. The streetlight lighting system of claim 11, wherein the emitting surface and major surface include two portions with different, non-zero radius of curvatures in the second dimension.

14. The streetlight lighting system of claim 11, wherein light emitted out the emitting surface provides a generally rectangular light distribution.

15. The streetlight lighting system of claim 11, further comprising light diffusing features on the major surface.

16. The streetlight lighting system of claim 15, wherein the diffusing features include Gaussian dots distributed on the major surface.

17. The streetlight lighting system of claim 15, wherein the light diffusing features are epoxy dots distributed on the major surface.

18. The streetlight lighting system of claim 15, wherein the light diffusing features are printed or molded on the major surface.

19. The streetlight lighting system of claim 11, wherein the light diffusing features diffuse an incident light ray along a direction of the incident light ray and provide a half width, half maximum (HWHM) light spread of between about 6 and 18 degrees centered around the direction of the impinging light ray.

20. The streetlight lighting system of claim 11, further comprising wherein a light emission from the emitting surface provides a distribution peak angle that is variable relative to a horizontal angle.

* * * * *